(12) United States Patent
Murakami et al.

(10) Patent No.: US 8,547,814 B2
(45) Date of Patent: Oct. 1, 2013

(54) SEMICONDUCTOR LASER DEVICE, OPTICAL PICKUP APPARATUS, AND METHOD OF MANUFACTURING SEMICONDUCTOR LASER DEVICE

(75) Inventors: Shinzoh Murakami, Osaka (JP); Mototaka Taneya, Osaka (JP); Takahide Ishiguro, Osaka (JP); Katsushige Masui, Osaka (JP); Satoru Fukumoto, Osaka (JP); Takeshi Horiguchi, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 25 days.

(21) Appl. No.: 13/228,222

(22) Filed: Sep. 8, 2011

(65) Prior Publication Data
US 2012/0063281 A1    Mar. 15, 2012

(30) Foreign Application Priority Data

Sep. 10, 2010   (JP) .................................. 2010-203758
Nov. 19, 2010   (JP) .................................. 2010-259583

(51) Int. Cl.
*G11B 7/00*   (2006.01)

(52) U.S. Cl.
USPC ................. 369/112.05; 369/44.37; 369/44.23

(58) Field of Classification Search
USPC ................. 369/44.23, 44.37, 112.01, 112.04, 369/112.05–112.07, 112.12, 112.15, 121, 369/122
See application file for complete search history.

(56) References Cited

U.S. PATENT DOCUMENTS

| 6,043,911 | A  | * | 3/2000  | Yang ............................. 369/103 |
| 6,043,935 | A  | * | 3/2000  | Lee ........................... 369/112.05 |
| 6,072,579 | A  | * | 6/2000  | Funato .................... 369/112.12 |
| 6,084,843 | A  | * | 7/2000  | Abe et al. ................. 369/112.07 |
| 6,130,872 | A  | * | 10/2000 | Sugiura et al. ........... 369/112.15 |
| 6,185,176 | B1 | * | 2/2001  | Sugiura et al. ........... 369/112.15 |
| 6,643,245 | B2 | * | 11/2003 | Yamamoto et al. ...... 369/112.05 |
| 7,218,449 | B2 | * | 5/2007  | Drenten et al. ........... 369/112.05 |
| 2002/0027844 | A1 | * | 3/2002 | Furuhata et al. ........... 369/44.37 |
| 2002/0097659 | A1 | * | 7/2002 | Furuhata et al. .............. 369/121 |
| 2007/0195659 | A1 | * | 8/2007 | Yokota ....................... 369/44.23 |

FOREIGN PATENT DOCUMENTS

| JP | 2001-209963 | 8/2001 |
| JP | 2005-259268 | 9/2005 |
| JP | 2005-327335 | 11/2005 |

\* cited by examiner

*Primary Examiner* — Thang Tran
(74) *Attorney, Agent, or Firm* — Morrison & Foerster LLP

(57) ABSTRACT

In a diffractive element, its grating pattern is so configured that a diffraction angle of a diffracted light beam of a light source that is subject to the first-order diffraction in a diffraction area is matched with an angle of a light beam passing through the diffractive area emitted from a light source and a light source position is matched with a light originating point of the light source that emits a light beam to be transmitted, and the center of light intensity distribution is matched with that of the light source passing through the diffractive element by inclining an optical axis of the light source. A position of the diffractive element is adjusted based on an electric current value generated when a reflected return path light beam of the light source is diffracted by the diffractive element and enters the light source.

12 Claims, 19 Drawing Sheets

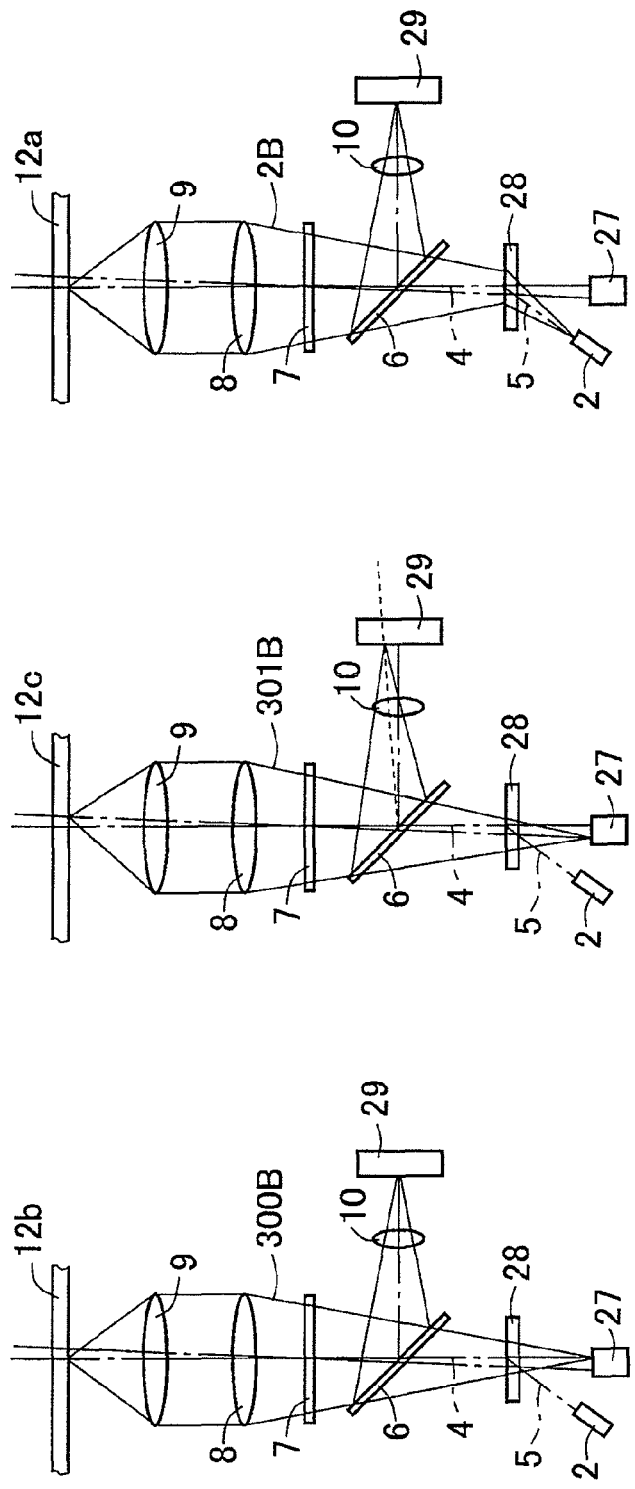

FIG. 14A
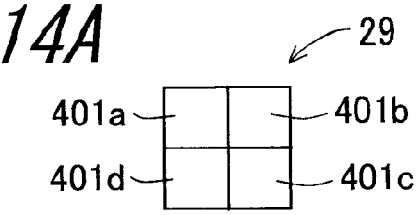
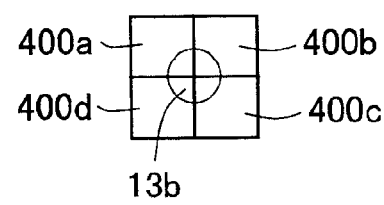
FIG. 14B
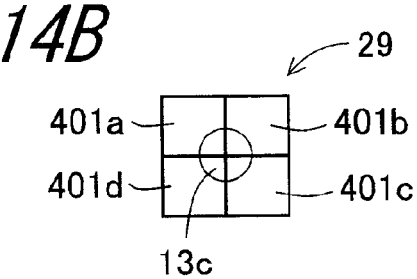
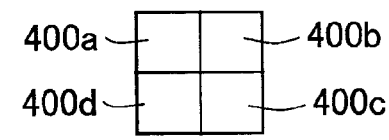
FIG. 14C
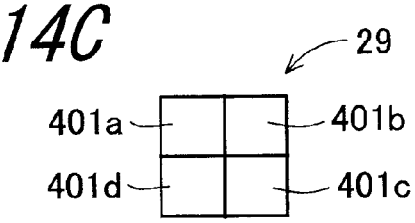
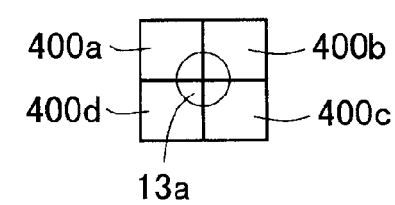

SEMICONDUCTOR LASER DEVICE, OPTICAL PICKUP APPARATUS, AND METHOD OF MANUFACTURING SEMICONDUCTOR LASER DEVICE

CROSS-REFERENCE TO RELATED APPLICATION

This application claims priority to Japanese Patent Application Nos. 2010-203758 and 2010-259583, which were filed on Sep. 10, 2010 and Nov. 19, 2010, respectively, the contents of which are incorporated herein by reference in its entirety.

BACKGROUND OF THE TECHNOLOGY

1. Field of the Technology

The present technology relates to a semiconductor laser device, an optical pickup apparatus, and a method of manufacturing a semiconductor laser device.

2. Description of the Related Art

In recent years, a semiconductor laser device has been often mounted in an optical pickup apparatus for recording and reproducing on an optical recording medium such as a CD (Compact Disk) which uses an infrared wavelength range in the vicinity of 780 nm for recording and reproducing information, a DVD (Digital Versatile Disk) which uses a red color range in the vicinity of 650 nm, and a BD (Blu-ray Disk) which uses a violet-blue wavelength range in the vicinity of 405 nm.

Optical pickup apparatuses corresponding to a number of types of optical recording media may include a plurality of semiconductor laser devices of a single wavelength. However, since the structure of the signal detection light-receiving element for detecting the reflective signal from the corresponding optical system or the optical recording medium is complicated, it is necessary to carry out cumbersome installation calibration procedures a lot of times, and it is difficult to achieve miniaturization.

For this reason, recently, for example, a semiconductor laser device capable of emitting lights of two wavelengths corresponding to the DVD and the CD in a single casing has been developed, and a technique capable of miniaturizing and assembling components of the optical system as an optical pickup apparatus or the signal detection light-receiving element by reducing the number of the elements has been proposed.

First, as a first related art, an optical pickup apparatus disclosed in Japanese Unexamined Patent Publication JP-A 2001-209963 will be described.

FIG. 15 is a simplified cross-section view illustrating a schematic configuration of the semiconductor laser device of the first related art. FIGS. 16A and 16B are simplified cross-sectional views illustrating a schematic configuration of the optical pickup apparatus having the semiconductor laser device of FIG. 15. First, the semiconductor laser device will be described.

The semiconductor laser device includes two light sources emitting two wavelengths composed of a light source X1A having a semiconductor laser element X1 to emit light beam having a wavelength $\lambda 1$ for DVD, and a light source X1B used to emit light beam having a wavelength $\lambda 2$ for CD, and a two-wavelength optical deflection element X2 having a birefringent material. The two-wavelength optical deflection element X2 is arranged with a predetermined angle such that a linearly-polarized light beam of the wavelength $\lambda 1$ entering the two-wavelength optical deflection element X2 serves as ordinary rays, and a linearly-polarized light beam having a wavelength $\lambda 2$ entering the two-wavelength optical deflection element X2 serves as extraordinary rays. The linearly-polarized light beam having a wavelength $\lambda 1$ directly transmits through the optical deflection element X2, and the linearly-polarized light beam having a wavelength $\lambda 2$ is deflected to make those optical axes in alignment with each other. Such a deflection angle is influenced by the gap of the light originating point between the optical source X1A and the light source X1B and the thickness of the optical deflection element X2 having the birefringent material.

Next, the optical pickup apparatus having the aforementioned semiconductor laser device will be described. The light beam of the wavelength $\lambda 1$ emitted from the light source X1A of the semiconductor laser device is transmitted through the optical deflection element X2 and is collimated through the collimator lens X3 and is condensed by the object lens X4 onto the optical recording medium X5. The light beam having a wavelength $\lambda 2$ emitted from the light source X1B is deflected by the optical deflection element X2 so that its optical axis is made in alignment with the optical axis of the wavelength $\lambda 1$, and is then transmitted through the collimator lens X3 and the object lens X4 and is condensed onto the optical recording medium X5 through the same optical path as that of the light source X1A.

Next, as a second related art, the semiconductor laser device disclosed in Japanese Unexamined Patent Publication JP-A 2005-259268 will be described.

FIG. 17 is a simplified cross-sectional view illustrating a schematic configuration of the semiconductor laser device according to the second related art. In the semiconductor laser device of this related art, three semiconductor laser elements having different wavelengths are arranged to be located on a straight line as seen from the light emitting side. When it is assumed that the wavelengths are $\lambda 1$ (light source X6A), and $\lambda 2$ (light source X6B), and 23 (light source X6C), they have a relationship $\lambda 1<\lambda 2<\lambda 3$, the light source X6A of the wavelength $\lambda 1$ is arranged in the center, the light sources X6B and X6C of the wavelengths $\lambda 2$ and $\lambda 3$, respectively, are arranged in both ends with distances d1 and d2, and a diffractive element X7 is arranged perpendicular to the optical axis of the wavelength $\lambda 1$ at a position away by a distance L in an optical axis direction of the wavelength $\lambda 1$.

The distances d1 and d2 of the light originating point gap of the light sources X6A to X6C are determined by the wavelengths $\lambda 2$ and $\lambda 3$ because the pitch of the diffractive element X7 and the distance L from the light originating point of each semiconductor laser element to the diffractive element X7 are constant. As a result, similar to the first related art, by making the first-order diffracted light beam diffracted by the diffractive element X7 the optical axis of the light beam having a wavelength $\lambda 1$ in alignment with each other, it is possible to allow the first-order diffracted light beam to pass through the same optical path as that of the collimator lens and the object lens (not shown).

Next, as a third related art, an optical pickup apparatus disclosed in Japanese Unexamined Patent Publication JP-A 2005-327335 will be described.

FIG. 18 is a simplified cross-sectional view illustrating a schematic configuration of the optical pickup apparatus according to the third related art. The optical pickup apparatus according to the third related art includes: semiconductor laser devices X8A and X8B that emits light beams of two different wavelengths $\lambda 1$ and $\lambda 2$; a diffractive element X9 that diffracts the light beams of wavelengths $\lambda 1$ and $\lambda 2$; a collimator lens X10 for collimating the first-order diffracted light beam diffracted by the diffractive element X9; an object lens X11 for condensing the light beam parallelized by the collimator lens X10 onto an optical recording medium X12; and a signal detection light-receiving element X13 that receives the reflective light beam from the optical recording medium X12.

The diffractive element X9 has a diffractive grating pattern formed as a transmissive hologram on a glass substrate to make the first-order diffracted light beams of the respective wavelength λ1 and λ2 in alignment with each other to be guided to the optical recording medium X12. In addition, an optical thin film and a wavelength plate (not shown) are formed on the glass substrate such that a light beam which is transmitted through the forward path and then reflected by the optical recording medium X12 in the return path is reflected to the signal detection light-receiving element X13.

However, according to the first related art, as described above, the deflection angle by the optical deflection element X2 is influenced by the light originating point gap of the light source X1A and the light source X1B and the thickness of the optical deflection element X2 having the birefringent material. When there is a thickness deviation therein, it is difficult to make the optical axes of the light sources X1A and X1B in alignment with each other. In addition, if two light sources are included in a single semiconductor laser element X1, the influence may be reduced. However, if the two semiconductor laser elements are used, an installation deviation is generated in the light originating point gap or the inclinations of each optical axis so that it is difficult to make the optical axes in alignment with each other. As a result, a position or an intensity distribution of the light spot on a light-receiving surface of the signal detection light-receiving element (not shown) that receives the reflective light beam from the optical recording medium varies, and it is difficult to carry out stable operations as an optical pickup apparatus. In addition, in a case where three or more light sources are used, it is difficult to provide a single optical axis using a single birefringent optical element. Furthermore, the optical path length varies from the light sources X1A and X1B to the light-emitting surface of the optical deflection element X2, and the focus position is deviated on a light-receiving surface of the signal detection light-receiving element (not shown) that receives the reflective light beam from the optical recording medium X5 of the optical pickup apparatus. Therefore, in a case where a servo signal and an information signal are received in a common light-receiving area, a focus deviation is generated, and it is difficult to stably reproduce the signal of the optical recording medium.

In addition, according to the second related art, the incident angles of the light beams of wavelengths λ2 and λ3 to the diffractive element X7 vary depending on installation accuracy of three light sources X6A to X6C, position deviations in the optical axis directions of each light source X6A to X6C, as well as the distances d1 and d2 of the light originating point gap, and it is difficult to make three optical axes diffracted by the diffractive element X7 in alignment with one another. Furthermore, if the position deviation is generated in the optical axis direction of the semiconductor laser element, the focal position of the light beam entering the signal detection light-receiving element (not shown) is deviated, so that the reflective light from the optical recording medium may suffer from a focus deviation, and it may be difficult to stably reproduce the signal of the optical recording medium. Similar to the first related art, if there is an optical path difference to the diffractive element X7 exists between the wavelengths λ2 and λ3, the focal position is deviated in each wavelength on the signal detection light-receiving element. When a servo signal and an information signal are received by a common light-receiving area, a focus deviation may occur, and it may be difficult to stably reproduce the signal of the optical recording medium.

In addition, the light sources X6B and X6C are separated from the light source X6A, and the output directions of the light beams from the light sources X6B and X6C are inclined with a predetermined angle with respect to the diffractive element X7. Therefore, the centers of the intensity distributions for the light sources X6B and X6C are reversely deviated from the center of the intensity distribution of the light source X6A so that the centers of the intensity distributions of the light beams incident onto the light-receiving area of the signal detection light-receiving element (not shown) are different from each other. Therefore, since offsets in different directions are introduced into a radial error signal detected through a push-pull method, and particularly, in the light beams of the wavelengths λ2 and λ3 from the light sources X6B and X6C, respectively, it may be difficult to stably reproduce the signal from the optical recording medium.

In addition, since the light sources X6B and X6C are arranged by interposing the light source X6A therebetween, and the grating shape of the diffractive element X7 is formed to have a grating pattern of a constant period, due to a difference of the incident angle between the main light beam and the peripheral light beam, the diffraction angle differs between the main light beam and the peripheral light beam depending on the incident angle and the wavelength. For example, out of the light beams emitted from the light source X6B, while the light beam entering the point X8 in the center of the diffractive element X7 is diffracted in the Z direction, the diffraction angle φ2C of the light beam entering the point X9 deviated from the point X8 on the light source X6B side by a distance r1 is not bisymmetric with the diffraction angle φ2B of the light beam entering the point X10 deviated from the point X8 on the light source X6A side by a distance r1. As a result, the light beams of the light source X6B and X6C emitted from the object lens of the optical pickup apparatus (not shown) and condensed onto the optical recording medium, are subject to significant aberration with respect to the condensing spot of the center light source X6A so that it may be difficult to stably reproduce a servo signal and an information signal such as from pits or the like on the optical recording medium.

In addition, in the third related art, in a case where a diffractive element including a single kind of grating is irradiated by two light sources having different wavelengths, the diffraction angle of the main light beam may be matched, but the diffraction angle of the peripheral light beam is different as in the second related art described above. Therefore, the condensing spot on the optical recording medium is subject to significant aberration, so that it may be difficult to stably reproduce the servo signal and the information signal such as pits or the like on the optical recording medium. Furthermore, since the diffraction angle of the main light beam is different from the diffraction angle of the peripheral light beam, the condensing position in the optical axis direction is different even in the condensing spot on the signal detection light-receiving element. As a result, a focus deviation is generated with different light sources, and it may be difficult to stably reproduce the signal of the optical recording medium.

SUMMARY OF THE TECHNOLOGY

An object of the technology is to provide a semiconductor laser device, an optical pickup apparatus, and a method of manufacturing a semiconductor laser device, capable of making optical axes in alignment with each other and matching intensity distributions thereof and optical path lengths of the output light beams of different light sources of two or more different wavelengths.

The technology provides a semiconductor laser device comprising:
a plurality of light sources that emit light beams having different wavelengths; and
a diffractive element that diffracts a light beam so that an optical axis of a light beam having a wavelength emitted from one of two light sources among the plurality of the light sources is made in alignment with an optical axis of a light beam having a different wavelength emitted from the other of the two light sources, the diffractive element having a diffractive area where the light beam emitted from the one of the two light sources is diffracted with an angle which is formed by the optical axis of the light beam emitted from the one light source and the optical axis of the light emitted from the other light source so that a light beam which is emitted from the one light source and diffracted by the angle fits light beam which is emitted from the other light source and transmitted through the diffractive element.

A semiconductor laser device comprises: a plurality of light sources that emit light beams having different wavelengths; and a diffractive element that diffracts a light beam so that an optical axis of a light beam having a wavelength emitted from one of two light sources among the plurality of the light sources is made in alignment with an optical axis of a light beam having a different wavelength emitted from the other of the two light sources, the diffractive element having a diffractive area where the light beam emitted from the one of the two light sources is diffracted with an angle which is formed by the optical axis of the light beam emitted from the one light source and the optical axis of the light beam emitted from the other light source so that a light beam which is emitted from the one light source and diffracted by the angle fits a light beam which is emitted from the other light source and transmitted through the diffractive element. Accordingly it is possible to make optical axes in alignment with each other and match optical path lengths between light beams having different wavelengths emitted from different light sources and return path light beams thereof.

Further, it is preferable that the diffractive element has a diffractive area where a light beam having a wavelength emitted from the one light source is subject to first-order diffraction, and a light beam having a different wavelength emitted from the other light source is transmitted or subject to zero-order diffraction.

The diffractive element has a diffractive area where a light beam having a wavelength emitted from the one light source is subject to first-order diffraction, and a light beam having a different wavelength emitted from the other light source is transmitted or subject to zero-order diffraction. Therefore, with respect to the light beam having the different wavelength emitted from the other light source, which is transmitted or subject to a zero-order diffraction, high efficiency of transmission or the zero-order diffraction is easily set in comparison with the first-order diffraction efficiency using the diffractive element without affecting the optical axis, the intensity distribution, and the optical path length by the diffractive element. Therefore, it is possible to obtain a high light output necessary in the recording on the optical recording medium.

Further, it is preferable that the diffractive element includes a diffractive area where the light beams having a plurality of wavelengths emitted from at least two or more light sources are subject to first-order diffraction to make optical axes in alignment with each other, and a light beam having a further different wavelength emitted from another light source is transmitted or subject to zero-order diffraction.

The diffractive element includes a diffractive area where the light beams having a plurality of wavelengths emitted from at least two or more light sources are subject to first-order diffraction to make optical axes in alignment with each other, and a light beam having a further different wavelength emitted from another light source is transmitted or subject to zero-order diffraction. Therefore, with respect to the light beam having the different wavelength emitted from the other light source, which is transmitted (subject to a zero-order diffraction), high efficiency of transmission or the zero-order diffraction is easily set in comparison with the first-order diffraction efficiency using the diffractive element without affecting the optical axis, the intensity distribution, and the optical path length by the diffractive element. Therefore, it is possible to obtain a high light output necessary in the recording on the optical recording medium. Even for the light beams having two or more wavelengths, since light beams having different wavelengths transmitting through the optical axis can be combined into one beam, it is possible to easily adjust the optical axis or the intensity distribution.

Further, it is preferable that an output angle of the one light source for light beam having one wavelength to be diffracted matches with a straight line direction connecting a cross point between an optical axis of the other light source for the light beam having the other wavelength to be transmitted through the diffractive element and the diffractive area of the diffractive element, and the one light source for light beam having one wavelength to be diffracted.

An output angle of the one light source for light beam having one wavelength to be diffracted matches with a straight line direction connecting a cross point between an optical axis of the other light source for the light beam having the other wavelength to be transmitted through the diffractive element and the diffractive area of the diffractive element, and the light source for light beam having one wavelength to be diffracted. Therefore, it is possible to make the centers of intensity distributions and optical axes of light beams having two or more wavelengths in alignment with each other.

Further, it is preferable that the diffractive element includes a plurality of diffractive areas that diffract light beams having wavelengths other than the other wavelength in the light beam to be transmitted through the diffractive element, in an optical axis direction of the light beam having the other wavelength to be transmitted through the diffractive element, and that the optical axes of a plurality of light beams having the different wavelengths to be diffracted are made in alignment with the optical axis of the light beam having the other wavelength to be transmitted through the diffractive element.

The diffractive element includes a plurality of diffractive areas that diffract light beams having wavelengths other than the other wavelength in the light beam to be transmitted through the diffractive element, in an optical axis direction of the light beam having the other wavelength to be transmitted through the diffractive element, and the optical axes of a plurality of light beams having the different wavelengths to be diffracted are made in alignment with the optical axis of light beam having the other wavelength to be transmitted through the diffractive element. Therefore, it is possible to match the transmitting wavelength light with the optical axis even when there are a plurality of light beams having wavelengths to be diffracted, it is possible to make their optical axes in alignment with the optical axis of the light beam having the wavelength to be transmitted, and it is possible to make optical axes of light beams having three or more wavelengths in alignment with one another.

Further, it is preferable that the optical axis of the light beam having one wavelength to be diffracted is made in alignment with one of optical axes of a plurality of light beams having other wavelengths to be transmitted through the diffractive element.

The optical axis of the light beam having one wavelength to be diffracted is made in alignment with one of optical axes of a plurality of light beams having other wavelengths to be transmitted through the diffractive element. Therefore, even when there are a plurality of light beams having wavelengths to be transmitted without diffraction, it is possible to make an optical axis of one of those light beams having the wavelengths in alignment with an optical axis of the light beam having the wavelength to be diffracted.

Further, it is preferable that the diffractive area includes a wavelength selectable diffractive area.

Since the diffractive area includes a wavelength selectable diffractive area, it is possible to increase diffraction efficiency of the wavelength using the diffractive element and increase the light amount of the forward path light beam.

Further, it is preferable that the diffractive area includes a polarization anisotropic diffractive area.

Since the diffractive area includes a polarization anisotropic diffractive area, it is possible to reduce a variation in the polarization angle or the polarization ratio using the diffractive element in a case where a wavelength plate is provided in the middle of the optical path.

Further, it is preferable that the diffraction area has a saw-tooth shape or an embossed shape obtained by approximating the saw-tooth shape.

Since the diffraction area has a saw-tooth shape or an embossed shape obtained by approximating the saw-tooth shape, it is possible to increase diffraction efficiency of the first-order diffracted light beam of the diffractive element and increase the light amount in the forward path.

The technology provides an optical pickup apparatus comprising:

the semiconductor laser device described above;

an optical system for irradiating an optical recording medium with a light beam emitted from the semiconductor laser device; and a signal detection light-receiving element for receiving a light beam reflected from the optical recording medium and reading a servo signal and an information signal.

The optical pickup apparatus comprises: the semiconductor laser device described above; an optical system for irradiating an optical recording medium with a light beam emitted from the semiconductor laser device; and a signal detection light-receiving element for receiving a light beam reflected from the optical recording medium and reading a servo signal and an information signal. Therefore, it is possible to reduce the number of components in the optical pickup apparatus and achieve miniaturization.

Further, it is preferable that light beams having at least two or more wavelengths out of light beams having a plurality of wavelengths are received by a shared light-receiving portion.

Light beams having at least two or more wavelengths out of light beams having a plurality of wavelengths are received by a shared light-receiving portion. Therefore, it is possible to simplify the configuration of the light-receiving portion of the signal detection light-receiving element and share the incident light spot, and then, it is possible to more stably detect the servo signal and the information signal.

The technology provides a method of manufacturing a semiconductor laser device described above, comprising:

receiving a light beam having a different wavelength diffracted by a diffractive area and detecting an electric current generated from a light source; and determining a position of a diffractive element based on the electric current value.

The method of manufacturing a semiconductor laser device comprises receiving a light beam having a different wavelength diffracted by a diffractive area and detecting an electric current generated from a light source; and determining a position of a diffractive element based on the electric current value. Therefore, it is possible to make an optical axis of the light beam having the different wavelength and an optical axis of the light beam having the wavelength to be transmitted through the diffractive element in alignment with each other, and match an intensity distribution and an optical path length of a light beam having the different wavelength with an intensity distribution and an optical path length of the light beam having the wavelength to be transmitted through the diffractive element with high precision.

BRIEF DESCRIPTION OF THE DRAWINGS

Other and further objects, features, and advantages of the technology will be more explicit from the following detailed description taken with reference to the drawings wherein:

FIGS. 1A and 1B are simplified cross-sectional views illustrating a schematic configuration of a semiconductor laser device according to a first embodiment, in which FIG. 1A illustrates a forward optical path of the semiconductor laser device, and FIG. 1B illustrates a return optical path of the semiconductor laser device;

FIGS. 3A and 3B are simplified cross-sectional views illustrating a schematic configuration of an optical pickup apparatus having the semiconductor laser device shown in FIGS. 1A and 1B, in which FIG. 3A illustrates an optical path of an output light beam of a first light source, and FIG. 3B illustrates an optical path of an output light beam of a second light source;

FIGS. 4A and 4B are front views illustrating a signal detection light-receiving element arranged inside the optical pickup apparatus as seen from a light-receiving surface side, in which FIG. 4A illustrates a condensing position of the output light beam of the first light source on the light-receiving surface of the signal detection light-receiving element, and FIG. 4B illustrates a condensing position of the output light beam of the second light source on the light-receiving surface of the signal detection light-receiving element;

FIGS. 8A and 8B are simplified cross-sectional view illustrating a schematic configuration of a semiconductor laser device according to a second embodiment, in which FIG. 8A illustrates a forward optical path of the semiconductor laser device, and FIG. 8B illustrates a return optical path of the semiconductor laser device;

FIGS. 11A and 11B are diagrams illustrating an optical pickup apparatus having the semiconductor laser device of FIGS. 8A and 8B, in which FIG. 11A is a simplified cross-sectional view illustrating a schematic configuration of the optical pickup apparatus, and FIG. 11B is a plan view illustrating a signal detection light-receiving element arranged in the optical pickup apparatus as seen from the top;

FIGS. 12A and 12B are simplified cross-sectional views illustrating a schematic configuration of a semiconductor laser device according to a third embodiment, in which FIG. 12A illustrates a forward optical path of the semiconductor laser device, and FIG. 12B illustrates a return optical path of the semiconductor laser device;

FIGS. 13A to 13C are diagrams illustrating an optical path when a light beam having a third wavelength is emitted;

FIGS. 14A to 14C are diagrams illustrating a condensing position in the return path in which the light beam having the third wavelength is condensed onto a signal detection light-receiving element;

DETAILED DESCRIPTION

Figure 1A:
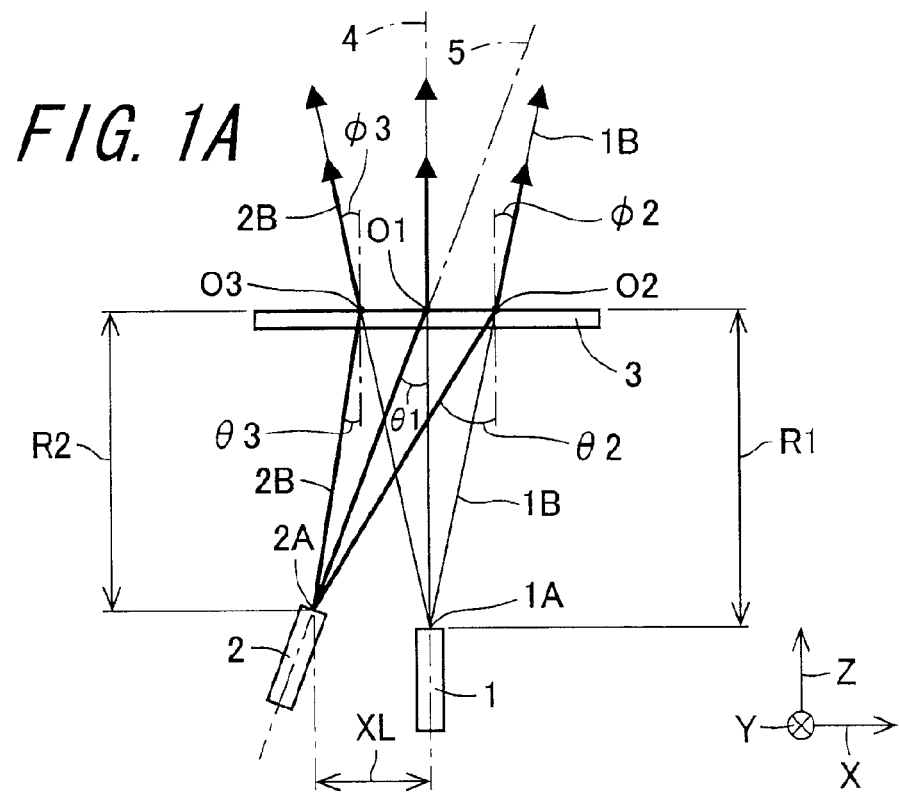

Now referring to the drawings, preferred embodiments of the technology are described below.

First Embodiment

Figure 1B:
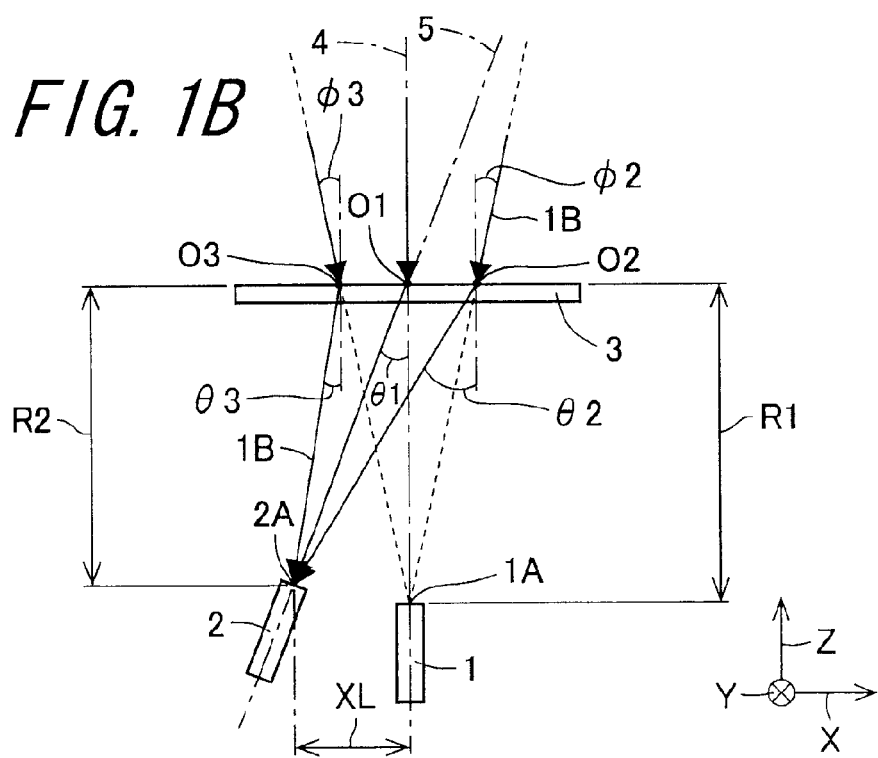
Figure 2:
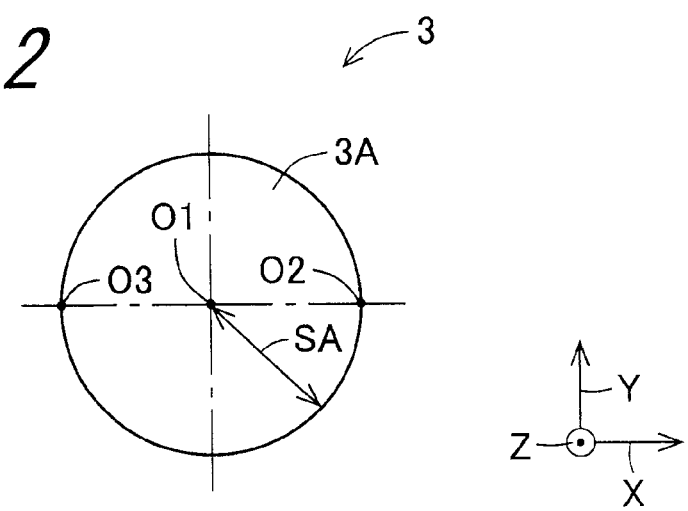
FIG. 2 is a plan view illustrating a diffractive element mounted in the semiconductor laser device of FIGS. 1A and 1B as seen from the top of FIGS. 1A and 1B.

First, an optical pickup apparatus according to a first embodiment will be described. FIGS. 1A and 1B are simplified cross-sectional views illustrating a schematic configuration of a semiconductor laser device according to a first embodiment, in which FIG. 1A illustrates a forward optical path of the semiconductor laser device, and FIG. 1B illustrates a return optical path of the semiconductor laser device. FIG. 2 is a plan view illustrating a diffractive element 3 mounted in the semiconductor laser device of FIGS. 1A and 1B as seen from the top of FIGS. 1A and 1B.

First, a method of manufacturing the semiconductor laser device will be described.

The semiconductor laser device includes a first light source 1 composed of a semiconductor laser element that oscillates a light beam having a first wavelength, a second light source 2 composed of a semiconductor laser element that oscillates a light beam having a second wavelength, and a diffractive element 3 that transmits or diffracts the light beam emitted from each of the light sources 1 and 2 and a light beam reflected by an optical recording medium. The first light source 1 is implemented by a semiconductor laser element that oscillates a light beam (red light) having a wavelength of $\lambda1=650$ nm for a DVD (digital versatile disk). In addition, the second light source 2 is implemented by a semiconductor laser element that oscillates a light beam (infrared light) having a wavelength of $\lambda2=780$ nm for a CD (compact disc).

The diffractive element 3 is arranged so as to be distant from the light originating point 1A of the first light source 1 by a distance R1 and so that a diffractive surface is perpendicular to an optical axis 4 of the first light source 1 in a position where a light beam passes through the center point O1 of the diffractive element 3. the second light source 2 is arranged so that an optical axis 5 thereof passes through the center point O1 and is inclined with an angle $\theta1$ on an X-Z plane with respect to the diffractive element 3, and the light originating point 2A thereof is separated from the center point O1 with a distance R2. The distances R1 and R2 are not absolute distances, but optical distances (optical path lengths).

Here, three perpendicular axes X, Y, and Z in FIGS. 1A, 1B, and 2 will be described. The Z-axis is defined as an axial line made in alignment with the optical axis 4 of the light beam emitted from the first light source 1. The X-axis is one of two axes indicating the coordinates on one imaginary plane (X-Y plane) normal to the Z-axis, and is also defined as an axial line as one of two axes indicating coordinates on one imaginary plane (X-Z plane) commonly including the optical axis 4 of the first light source 1 and the optical axis 5 of the second light source 2. The Y-axis is one of two axes indicating coordinates on one imaginary plane (X-Z plane) perpendicular to the Z-axis, and is also defined as an axial line perpendicular to the X-axis.

The diffractive element 3 includes a single diffractive area 3A. The diffractive area 3A is a circular area within a radius SA from the center point O1. The diffractive area 3A has a diffractive grating pattern formed such that the light beam having the second wavelength $\lambda2$ emitted from the second light source 2 is diffracted to make a first-order diffracted light beam thereof in alignment with the optical axis 4, and the object light beam thereof is emitted from the same position as that of the light originating point 1A of the first light source 1 when the light beam having the second wavelength $\lambda2$ emitted from the light originating point 2A of the second light source 2 is used as reference light beam of the diffractive area 3A. That is, the diffractive grating for exhibiting an imaginary light source is formed such that the light beam having the second wavelength $\lambda2$ from the second light source 2 subject to the first-order diffraction using the diffractive grating of the diffractive area 3A is emitted from the light originating point 1A of the first light source separated from the point O1 on the optical axis 4 in the Z direction with a distance R1.

That is, the diffractive area 3A is an area for diffracting a forward path light beam of the light source 2 having the wavelength $\lambda2$, and has a diffractive grating pattern formed such that the light originating point of the light beam having the wavelength $\lambda1$ and the light originating point of the imaginary light source of the first-order diffracted light beam having the wavelength $\lambda2$ generated by the diffractive area 3 match with each other at the light originating point 1A of the light source 1.

The diffractive element 3 may have an embossed shape or a saw-tooth shape on an optical substrate made of quartz glass or a transparent resin layer or, as disclosed in Japanese Examined Patent Publication JP-B2 4474706, may have wavelength selectivity and polarization characteristics by forming diffractive grating using a birefringent material made of polymer liquid crystals on an optical planar substrate and filling an acrylic isotropic material thereon.

The diffractive grating pattern of the diffractive area 3A will be described. The diffractive element 3 has a diffractive grating pattern having an embossed shape (not shown), and its pitch is obtained as follows.

The pitches p1 and p2 of the diffractive grating pattern at the points O1 and O2 satisfy the following conditions:

$$p1 = \lambda 1/\sin\theta 1 \qquad (1)$$

$$p2 = \lambda 1/(\sin\theta 2 - \sin\phi 2) \qquad (2)$$

where, O1 denotes the center of the diffractive area 3A on the X-Y plane, O2 denotes a point separated from the center O1 of the diffractive area 3A with a radius SA in the +X direction, φ2 denotes an incident angle of the return path light beam having the wavelength λ1 oscillating from the light source 1 to the point O2 of the diffractive area 3B, and θ2 denotes a diffraction angle of the positive first-order diffracted light beam. In addition, the incident angle φ2 and the diffraction angles θ1 and θ2 are defined as follows.

$$\phi 2 = a\tan(SA/R1) \qquad (3)$$

$$\theta 1 = a\tan(XL/R2) \qquad (4)$$

$$\theta 2 = a\tan((XL+SA)/R2) \qquad (5)$$

Here, XL denotes a light originating point distance between the light originating point 1A of the first light source 1 and the light originating point 2A of the second light source 2.

Similarly, the diffractive grating pitch p3 of the point O3 separated with a radius SA in the −X direction can be obtained by determining the incident angle φ3 and the diffraction angle θ3 such that the return path light beam generated by reflecting the light beam having the wavelength λ1 from the light originating point 1A of the light source 1 is condensed onto the light originating point 2A of the light source 2. The diffractive grating pitches at any other non-illustrated points can be obtained using a similar method, and description thereof will be omitted.

As described above, when the light beam having the wavelength λ2 is emitted from the light originating point 2A, the forward path light beam having the wavelength λ2 can be emitted from the diffractive element 3 as if the light beam having the wavelength λ2 were emitted toward the diffractive element 3 separated from the light originating point 1A in the Z direction with a distance R1 (that is, the optical path length).

On the contrary, when the return path light beam having the wavelength λ2 propagating in a direction opposite to that of the forward path light beam enters the diffractive element 3, the zero-order diffracted light beam passing through the diffractive area 3A is condensed onto the light originating point 1A of the light source 1, and the first-order diffracted light beam diffracted by the diffractive area 3A is condensed onto the light originating point 2A of the light source 2 separated from the light originating point 1A with a distance XL in the X direction and with a distance R2 (that is, the optical path length) in the Z direction.

Although the aforementioned description has been made for a case where the diffractive area 3A is set such that the light beam having the wavelength λ2 emitted from the diffractive element 3 having an embossed shape is condensed onto the output surface of the light source 1 of the wavelength λ1, the technology is not limited thereto. By changing the embossed shape into a saw-tooth shape considering a polarization anisotropic characteristic and wavelength selectivity of the diffractive element 3, it is possible to increase diffraction efficiency of the first-order diffracted light beam emitted from the diffractive element 3.

Next, a structure and a principle of operations of the optical pickup apparatus having the aforementioned semiconductor laser device will be described.

Figure 3A:
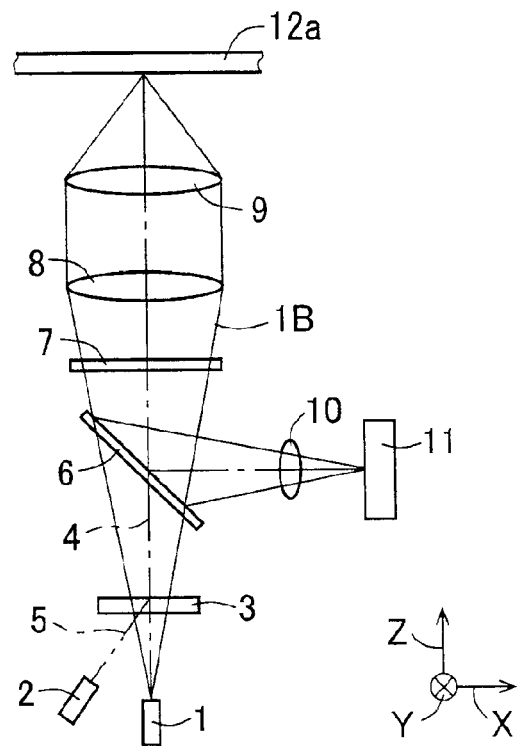
Figure 3B:
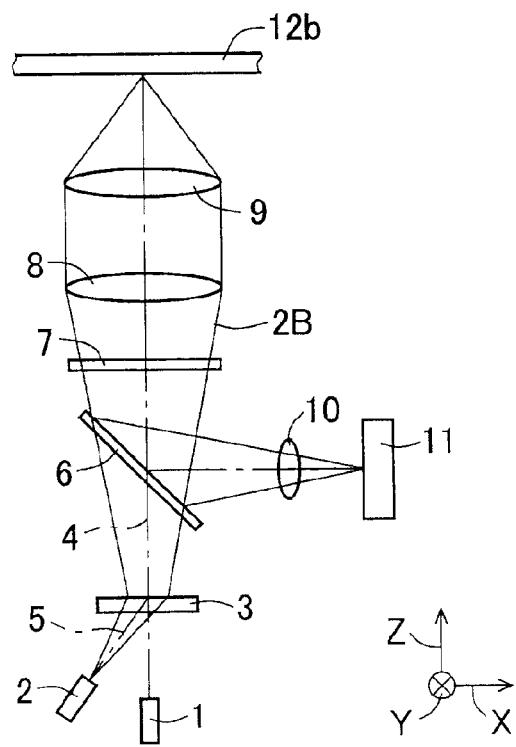
Figure 4A:
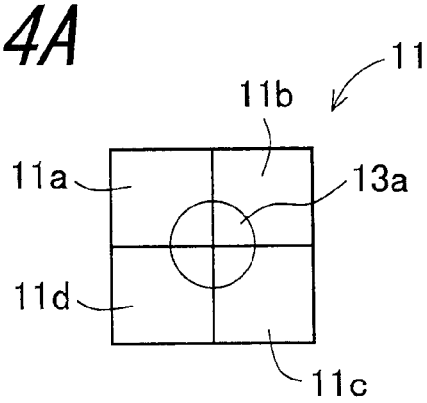
Figure 4B:
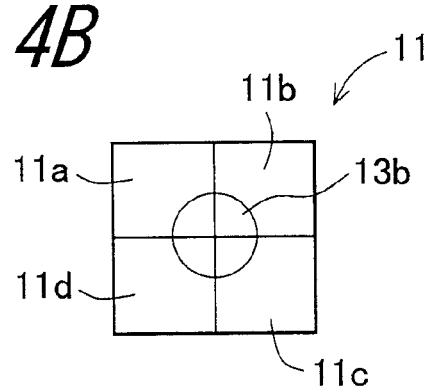

FIGS. 3A and 3B are simplified cross-sectional views illustrating a schematic configuration of the optical pickup apparatus having the semiconductor laser device shown in FIGS. 1A and 1B, in which FIG. 3A illustrates an optical path of the output light beam of the light source 1, and FIG. 3B illustrates an optical path of the output light beam of the light source 2. FIGS. 4A and 4B are front views illustrating a signal detection light-receiving element 11 arranged inside the optical pickup apparatus as seen from a light-receiving surface side, in which FIG. 4A illustrates a condensing position of the output light beam of the first light source 1 on the light-receiving surface of the signal detection light-receiving element 11, and FIG. 4B illustrates a condensing position of the output light beam of the second light source 2 on the light-receiving surface of the signal detection light-receiving element 11.

The optical pickup apparatus includes the light source 1, the light source 2, the semiconductor laser device having the diffractive element 3, a polarization beam splitter 6, a wavelength plate 7, a collimator lens 8, an object lens 9, a cylindrical lens 10, and a signal detection light-receiving element 11. The signal detection light-receiving element 11 has at least four light-receiving portions 11a to 11d.

First, a case where the light beam having the wavelength λ1 is emitted from the light source 1 will be described.

The light beam having the wavelength λ1 emitted from the light source 1 is diffracted by the diffractive area 3A of the diffractive element 3, and the zero-order diffracted light beam thereof is transmitted along the optical axis 4 and enters the polarization beam splitter 6 so as to transmit linearly-polarized light beam polarized only in a predetermined direction. The transmitted linearly-polarized light beam enters the wavelength plate 7 so as to convert the polarization direction. If the wavelength plate 7 is, for example, a ¼ wavelength plate, the linearly-polarized light beam is converted into and outputted as circular-polarized light beam. The light beam converted by the wavelength plate 7 is collimated by the collimator lens 8 and condensed onto the optical recording medium 12a by the object lens 9. The return path light beam reflected by the optical recording medium 12a and passing through the object lens 9 and the collimator lens 8 again enters the wavelength plate 7 so as to convert its polarization direction into another one different from that of the forward path, and is reflected by the polarization beam splitter 6. Accordingly, the light beam is narrowed onto the signal detection light-receiving element 11 through the cylindrical lens 10, and the signal detection light-receiving element 11 is arranged such that the light spot 13a thereof serves as the center of the light-receiving portions 11a to 11d.

If electric signals detected from the light-receiving portions 11a to 11d are denoted by A to D, respectively, a focus error signal FES and a radial error signal RES as the servo signal for allowing the light beam narrowed onto the optical recording medium 12a using the object lens 9 actuated by an actuator (not shown) to follow the track and the pitch on the optical recording medium 12 may be set to:

$$FES = (A+C) - (B+D) \qquad (6)$$

$$RES = (A+D) - (B+C) \qquad (7)$$

in which, an astigmatic method is employed in the focus error signal, and a push-pull method is employed in the radial error signal.

Therefore, by arranging the signal detection light-receiving element 11 in the X, Y, and Z directions such that the light spot on the signal detection light-receiving element 11 is narrowed when the light beam condensed onto the optical recording medium 12a is focused at maximum, and the light spot 13a is centered among the light-receiving portion 11a to 11d, it is possible to provide an optical pickup apparatus having little balance deviation or focus deviation in the focus error signal or the radial error signal when the light beam having the wavelength $\lambda 1$ is emitted.

Next, a case where the wavelength $\lambda 2$ is emitted from the light source 2 will be described. The light beam having the wavelength $\lambda 2$ emitted from the light source 2 is diffracted by the diffractive area 3A of the diffractive element 3 to provide the first-order diffracted light beam, and the angle of the optical axis is changed from the optical axis 5 to the optical axis 4. The subsequent optical path is the same as that described above, and description thereof will be omitted. Light-receiving portions on the signal detection light-receiving element 11 is shared by the light-receiving portions 11a to 11d described above.

As described above, while the position of the light originating point of the light source 2 and the optical distance up to the center point O1 passing through the optical axis 4 of the diffractive element 3 are separated with a distance XL in the X direction and with a distance R2 in the Z direction as in FIGS. 1A, 1B, and 2, an imaginary light originating point of the wavelength $\lambda 2$ caused by the diffractive area 3A of the diffractive element 3 is the light originating point of the light source 1 separated from the diffractive area 3A with a distance R1 in the Z direction, and the center of the intensity distribution of the light beam emitted from the optical axis 5 of the wavelength $\lambda 2$ matches with the center point O1 of the diffractive element 3. Therefore, the spot 13b of the return path light beam having the wavelength $\lambda 2$ condensed onto the signal detection light-receiving element 11 is narrowed at maximum when it is condensed onto the optical recording medium 12b, and the condensing position and the position of the intensity distribution center also match with the condensing spot 13a of the wavelength $\lambda 1$, so that the spot 13b of the return path light beam is incident onto the center position among the light-receiving portions 11a to 11d. In addition, since the light diffracted by the diffractive element 3 is emitted like the light beam emitted from the light source 1, the light condensed onto the light spot of the optical recording medium 12b has little aberration, similar to the light beam emitted from the light source 1. As a result, even when the light beam having the wavelength $\lambda 2$ is emitted, a balance deviation or a focus deviation is hard to be generated in the servo signal.

As a result, the optical path lengths of the light beams having the wavelengths $\lambda 1$ and $\lambda 2$ in the return path side are matched by matching the optical path lengths of the light beams having the wavelengths $\lambda 1$ and $\lambda 2$ in the forward path side, and the positions of the condensing spots on the signal detection light-receiving element 11 are also equalized. In addition, it is possible to match the positions of the centers in the intensity distribution for the light spots 13 on the signal detection light-receiving element 11 by matching the centers in the light intensity distribution on the center point O1 of the diffractive element 3 between the light beams having the wavelengths $\lambda 1$ and $\lambda 2$. Therefore, it is possible to share the light-receiving portion and prevent generation of a balance deviation or a focus deviation of the optical servo signal of two different wavelengths. In addition, similar to the light beam having the wavelength $\lambda 1$, the light beam having the wavelength $\lambda 2$ condensed onto the optical recording medium has little aberration. Therefore, it is possible to stably detect the recording signal on the optical recording medium.

Next, a structure and a principle of operations of a diffractive element adjustment apparatus that adjusts the position of the diffractive element 3 in the semiconductor laser device will be described.

Figure 5A:
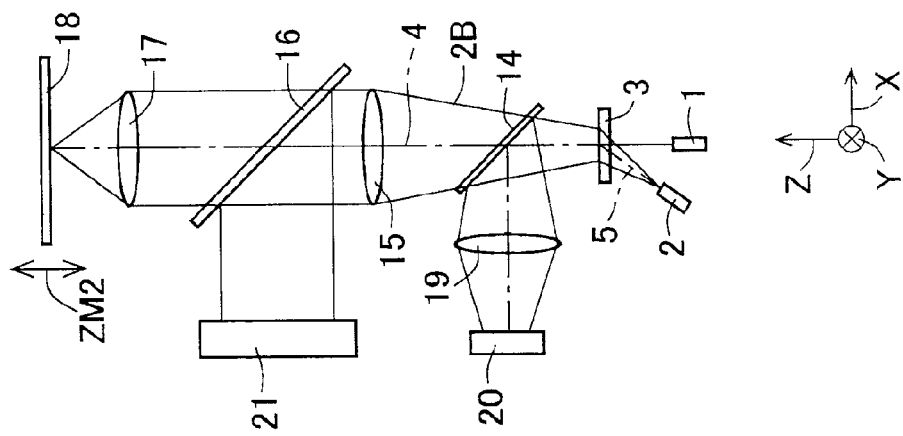
FIGS. 5A to 5C are simplified cross-sectional views illustrating a schematic configuration of a diffractive element adjustment apparatus that adjusts a position of a diffractive element of the semiconductor laser device of FIGS. 1A and 1B.
Figure 5B:
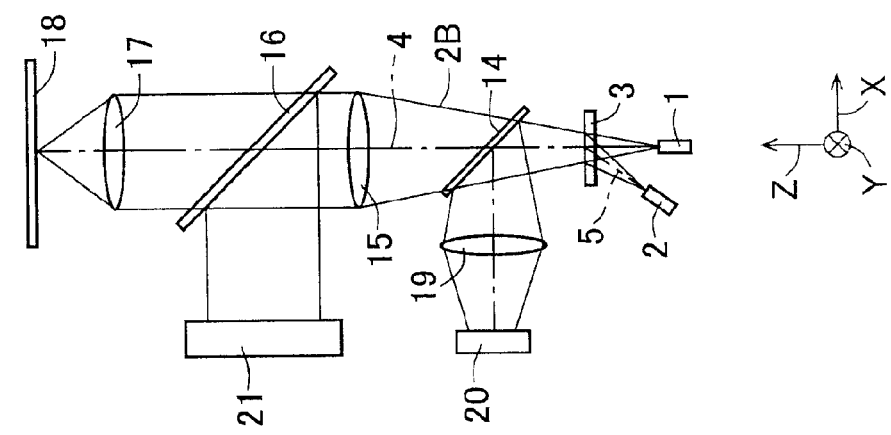
Figure 5C:
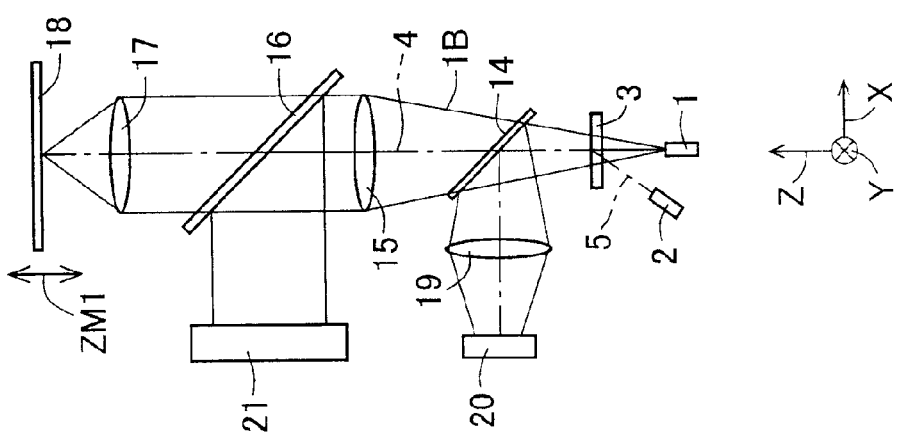
Figure 6A:
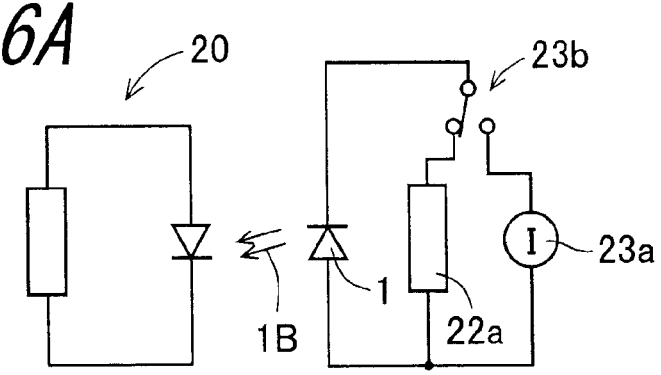
FIGS. 6A to 6C are diagrams illustrating an electric configuration of the diffractive element adjustment apparatus.
Figure 6B:
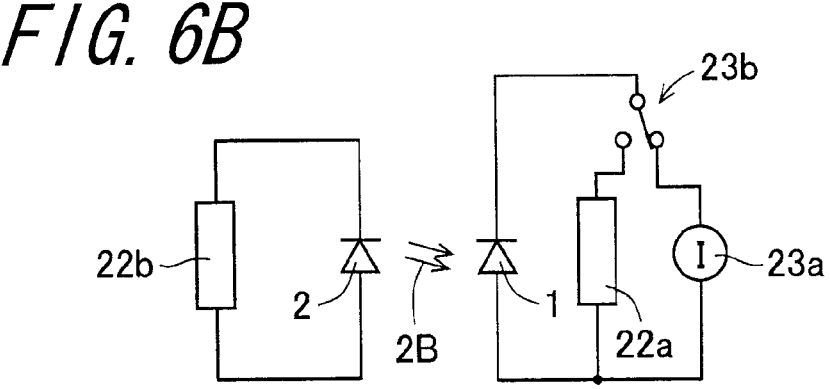
Figure 6C:
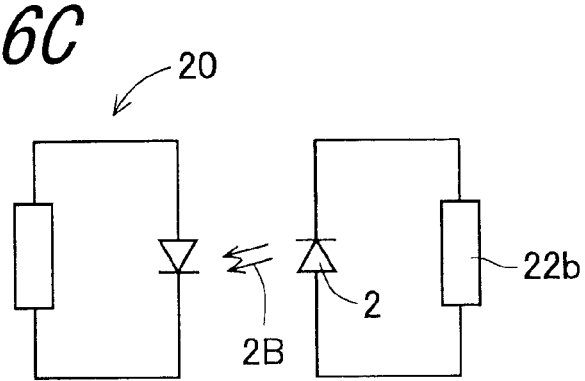
Figure 7A:
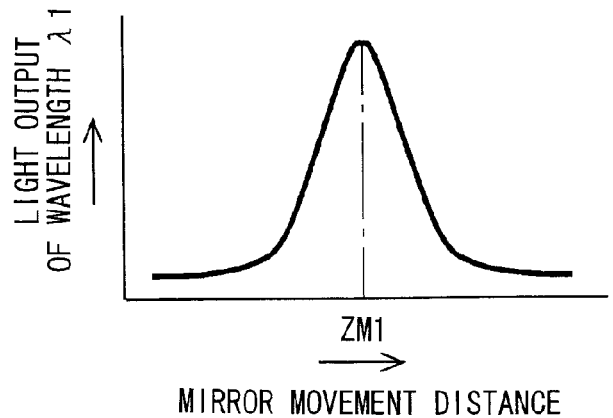
FIG. 7A is a graph illustrating a relationship between a mirror movement distance and a light output of a wavelength $\lambda 1$.
Figure 7B:
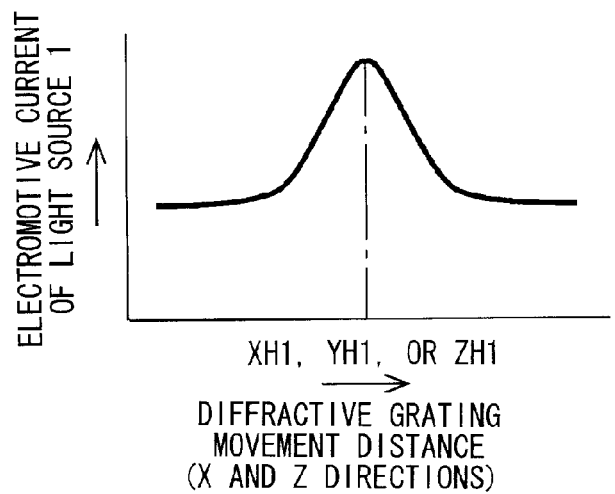
FIG. 7B is a graph illustrating a relationship between a diffractive grating movement distance and an electromotive current of the light source.
Figure 7C:
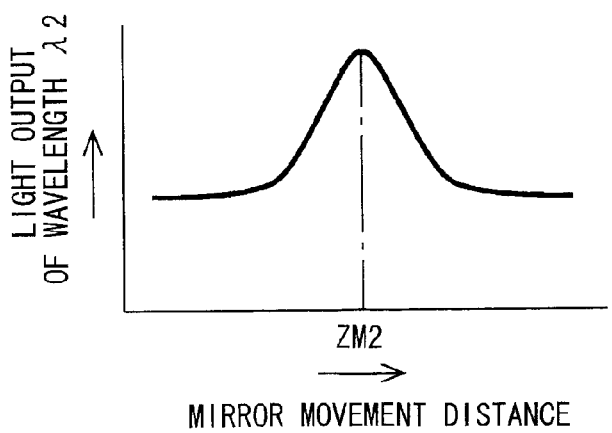
FIG. 7C is a graph illustrating a relationship between a mirror movement distance and a light output of a wavelength $\lambda 2$.

FIGS. 5A to 5C are simplified cross-sectional views illustrating a schematic configuration of a diffractive element adjustment apparatus that adjusts the position of the diffractive element 3 of the semiconductor laser device of FIGS. 1A and 1B, and FIGS. 6A to 6C are diagrams illustrating an electric configuration of the diffractive element adjustment apparatus. FIG. 7A is a graph illustrating a relationship between a mirror movement distance and a light output of the wavelength $\lambda 1$, FIG. 7B is a graph illustrating a relationship between a diffractive grating movement distance and an electromotive current of the light source 1, and FIG. 7C is a graph illustrating a relationship between a mirror movement distance and a light output of the wavelength $\lambda 2$. The semiconductor laser device includes a diffractive element adjustment apparatus. The diffractive element adjustment apparatus includes half mirrors 14 and 16, a collimator lens 15, an object lens 17, a total reflection mirror 18, a condensing lens 19, a light output detection light-receiving element 20, an auto-collimator 21, a semiconductor laser drive unit 22, a current meter 23a, and a switch 23b. Both the collimator lens 15 and the condensing lens include an achromatizing lens having no color aberration.

The semiconductor laser element including the light source 1 is electrically connected to the semiconductor laser drive unit 22a by the switch 23b, and a constant electric current is applied by the semiconductor laser drive unit 22a to emit the light beam 1B having the wavelength $\lambda 1$. The emitted light beam 1B having the wavelength $\lambda 1$ enters the half mirror 14 through the diffractive element 3. The half mirror 14 is inclined with an angle of 45° with respect to the optical axis 4. A part of the reflected light beams by the half mirror 14 have an optical axis 4 bent by 90°, and are condensed onto the light output detection light-receiving element 20 through the condensing lens 19 so that it is possible to measure the light output of the forward path light beam. In addition, the light beams passing through the half mirror 14 are collimated by the collimator lens 15 and enter the half mirror 16. Since the half mirror 16 is also inclined by 45° with respect to the optical axis 4, a part of the reflected light beams have an optical axis 4 inclined by 90° and reflected toward the auto-collimator 21. While the auto-collimator 21 can measure the optical axis 4 of the light beam having the wavelength $\lambda 1$, it may also include a photoelectric conversion element having a charge coupled device (CCD) capable of identifying the light intensity distribution.

The remaining light beam passing through the half mirror 16 is condensed onto the total reflection mirror 18 by the object lens 17. The return path light beam reflected by the total reflection mirror 18 passes through the object lens 17, the half mirror 16, the collimator lens 15, the half mirror 14, and the diffractive element 3. Out of the return path light beams 1B having the wavelength $\lambda 1$ passing through the diffractive area 3A of the diffractive element 3, the first-order diffracted light beam is diffracted by the diffractive area 3A with a diffraction angle larger than $\theta 1$ at the position of the center point O1 of the diffractive area 3A when a relationship between the wavelengths $\lambda 1$ and $\lambda 2$ is $\lambda 1 > \lambda 2$. Otherwise, when a relationship between the wavelengths $\lambda 1$ and $\lambda 2$ is λ1<λ2, the first-order diffracted light beam is diffracted with a diffraction angle smaller than θ1. In addition, the zero-order diffracted light beam of the return path light beams 1B passing through the diffractive area 3A is transmitted toward the light originating point 1A of the light source 1. The return path light beam 1B having the wavelength λ1 having entered the light originating point 1A enters the semiconductor laser element that is the light source 1 and is reflected by an output surface (not shown) inside the semiconductor laser element of the light source 1 and the rear reflective surface so that the internal light beam is amplified, and the electric current of the semiconductor laser element 1 increases. The electric current is amplified as the light amount of the return path light beam 1B having the wavelength λ1 entering the light source 1 increases, and the light beam is emitted from the light originating point 1A again. However, its light output is amplified in comparison with the light output when there is no return path light beam due to a SCOOP (self coupled optical pickup) phenomenon. Its light amount is amplified depending on the light amount of the return path light beam to the light originating point 1A, and the light output is measured using the light output detection light-receiving element 20. When the light beam 1B entering the light originating point 1A is condensed at maximum, the electric signal detected from the light output detection light-receiving element 20 is maximized.

Similarly, the semiconductor laser element that is the light source 2 receives a constant electric current from the semiconductor laser drive unit 22b and outputs a light beam 2B having the wavelength λ2. The emitted light beam 2B having the wavelength λ2 is diffracted by the diffractive element 3 to change the direction from the optical axis 5 to the optical axis 4 and enters the half mirror 14. The optical path from the half mirror 14 to the total reflection mirror is similar to that described above, and description thereof will be omitted. Similar to the case where the light beam is emitted from the light source 1, even when the light beam is emitted from the light source 2, it is possible to identify the light output of the wavelength λ2 using the light output detection light-receiving element 20, measure the optical axis of the light beam having the wavelength λ2 using the auto-collimator 21, and identify the light intensity distribution using the CCD-type photoelectric conversion element. Furthermore, in this case, by electrically connecting the semiconductor laser element 1 to the current meter 23a using the switch 23b, it is possible to measure the electromotive current generated in the semiconductor laser element 1 when the light beam 2B having the wavelength λ2 emitted from the light source 2 enters the semiconductor laser element 1. In this case, as the light amount of the light beam 2B having the wavelength λ2 entering the light originating point 1A of the semiconductor laser element 1 increases, the electromotive current generated in the semiconductor laser element 1 increases. Therefore, the electric current is maximized when the light beam 2B entering the light originating point 1A is condensed at maximum.

A method of adjusting the position of the diffractive element 3 using the aforementioned configuration will now be described in detail. As shown in FIG. 5A, as a first stage, the optical axis direction (Z direction) of the total reflection mirror 18 is finely adjusted such that the return path light beam 1B having the wavelength λ1 emitted from the light originating point 1A of the light source 1 of the semiconductor laser device mounted in the diffractive element adjustment apparatus is condensed onto the light originating point 1A again.

First, the semiconductor laser element that is the light source 1 is electrically connected to the semiconductor laser drive unit 22a using the switch 23b so that the semiconductor laser element that is the light source 1 is driven by the semiconductor laser drive unit 22a with a constant electric current to emit the light beam having the wavelength λ1. The light beam 1B directly passes through the diffractive element 3 which is not arranged in an optimal position so as to a part thereof is reflected to the half mirror 14 and enters the light output detection light-receiving element 20 to measure the light output thereof. The remaining light beam having passed through the half mirror 14 passes through the object lens 17 from the collimator lens 15 and is guided to the total reflection mirror 18. In a case where the returning light beam reflected by the total reflection mirror 18 is located in a position different from the condensing point by the object lens 17, the light beam returning from the total reflection mirror 18 to the output surface of the semiconductor laser element of the light source 1 again is not condensed. Therefore, the amount of the light beam entering the semiconductor laser element of the light source 1 is reduced, the SCOOP phenomenon generated in the semiconductor laser element is insignificant, and the electric signal outputted from the light output detection light-receiving element 20 is small.

In this regard, if the total reflection mirror 18 is finely adjusted in the Z direction corresponding to the optical axis direction, the spot diameter of the return path light beam arriving at the output surface of the semiconductor laser element varies, the amount of the light beam entering the output surface varies, the SCOOP phenomenon generated in the semiconductor laser element varies, and the electric signal outputted from the light output detection light-receiving element 20 varies. The varying electrical signal is adjusted at maximum by finely adjusting the total reflection mirror 18 in the optical axis direction during the measurement thereof (position ZM1). When the electric signal outputted from the light output detection light-receiving element 20 is maximized, the condensing point of the forward path light beam by the object lens 17 matches with the position of the total reflection mirror 18 in the Z direction, and the spot of the light beam returning to the light originating point 1A is condensed.

As a second stage, as shown in FIG. 5B, the position of the diffractive element 3 mounted in the semiconductor laser device is adjusted. The adjustment is carried out while the position ZM1 of the total reflection mirror 18 adjusted in the first stage is held. The light beam of the light source 1 is turned off, and the semiconductor laser element that is the light source 2 is driven by a constant electric current using the semiconductor laser drive unit 22b to emit the light beam having the wavelength λ2. In this case, the semiconductor laser element that is the light source 1 is electrically connected to the current meter 23a using the switch 23b. As the position of the diffractive area 3A of the diffractive element 3 is moved immediately above the light source 1, the first-order diffracted light beam having the wavelength λ2 is diffracted at an angle approximate to the optical axis 4. In this case, it is preferable that the position of the optical axis of the light beam having the wavelength λ2 is identified using the auto-collimator 21. However, if it is not identified, the position of the diffractive element 3 is adjusted while the electric signal detected from the light output detection light-receiving element 20 is measured. The direction of the position adjustment of the diffractive element 3 may be made in the X, Y, and Z directions to remarkably move the angle of the optical axis in the X and Y directions. As a result, it is possible to identify the optical axis of the auto-collimator 21. Furthermore, the position of the optical axis is made to substantially match with the position of the optical axis of the light source 1 identified in the first stage by finely adjusting the position of the diffractive element 3 in the X and Y directions. In this regard, in a case where the spot of the optical axis seen on the auto-collimator 21 also has a slightly large shape, the optical axes of the light sources 1 and 2 emitted from the diffractive element 3 are substantially matched. However, an imaginary light originating point of the light source 2 is deviated from the light originating point of the light source 1 in the Z direction. In this case, the electric current value generated when the light beam having the wavelength $\lambda 2$ enters the output surface of the semiconductor laser element of the light source 1 is measured using the current meter 23a, and the diffractive element 3 is driven in the Z direction and stops at a position where the electric current value is maximized. As the diffractive element 3 is driven in the Z direction, the optical axis is deviated in the X direction. Therefore, subsequently, the diffractive element is finely adjusted in the X direction and stops at a position where the electric current value measured by the current meter 23a is maximized. By repeating such adjustment several times, the electric current value increases, and the movement of the diffractive element 3 stops at the positions ZH1, XH1, and YH1 in the Z, X, and Y directions, respectively, where the electric current value is maximized.

In addition, the position of the optical axis of the light beam having the wavelength $\lambda 2$ measured using the auto-collimator 21 is identified, and the center position of the intensity distribution of the light beam having the wavelength $\lambda 2$ is identified using a built-in CCD camera. Under this state, the adjustment of the position of the diffractive element 3 is completed. As a result, as the adjustment of the position of the diffractive element 3 is completed, the diffractive element 3 is fixedly attached, and released from a holding jig (not shown) that holds the diffractive element 3.

As a third stage, as shown in FIG. 5C, the optical axis deviation, the intensity distribution deviation, and the focus position deviation of the light beam having the wavelength $\lambda 2$ emitted from the fixedly attached diffractive element 3 are identified.

First, the optical axis position and the parallelism of the light beam having the wavelength $\lambda 2$ are identified using the auto-collimator 21. The parallelism of the light beam can be generally determined using the spot diameter of the light beam having the wavelength $\lambda 2$ measured on the auto-collimator 21. If the spot diameter is narrowed down, the light beam having the wavelength $\lambda 2$ passing through the collimator lens 15 becomes a collimated light beam. In this case, the imaginary light originating point by the diffractive element 3 of the semiconductor laser element of the light source 2 substantially matches with the light originating point of the light source 1. That is, the distance (optical path length) in the optical axis direction matches with the distance (that is, optical path length) in the optical axis direction of the semiconductor laser element of the light source 1. However, in a case where the spot diameter of the light beam having the wavelength $\lambda 2$ on the auto-collimator 21 is large, the optical path length is deviated so that it is difficult to adjust the position of the diffractive element.

Finally, in a case where the diffractive element 3 is configured such that the light beam having the wavelength $\lambda 2$ reflected by the total reflection mirror 18 is returned to the output surface of the semiconductor laser element of the light source 2, whether or not the directional position of the optical axis of the total reflection mirror 18 matches with the condensing position of the object lens 17 is identified by measuring the electric signal output from the light output detection light-receiving element 20 based on the SCOOP phenomenon caused by the light beam having the wavelength $\lambda 2$ as in the first stage. Whether or not a difference $\Delta ZM$ between the position ZM2 of the total reflection mirror 18 at which the electric signal is maximized and the position ZM1 of the total reflection mirror 18 at which the electric signal of the light beam having the wavelength $\lambda 1$ obtained from the first stage is maximized is within a predetermined range is identified, and the process is terminated.

If the positional difference $\Delta ZM$ of the total reflection mirror 18 is not within a predetermined range, it can be said that the position of the light source 2 in the Z direction with respect to the light source 1 is significantly deviated. In addition, in a case where a positional difference of between light sources 1 and 2 identified by the auto-collimator 21 is larger than a predetermined range even when the positional difference $\Delta ZM$ is within a predetermined range, it can be said that the position of the light source 2 in the X and Y directions with respect to the light source 1 is significantly deviated. In addition, if a deviation of the intensity distribution is significantly different between the light sources 1 and 2, any one or both of the light sources 1 and 2 may be largely rotated on the X-Z plane. Based on this fact, it is necessary to fix the light sources 1 and 2 to a predetermined position in the X, Y, and Z directions and the rotation direction on the X-Z plane with a predetermined precision.

As described above, since the aforementioned diffractive element is provided in the semiconductor laser device including light sources of two different wavelengths, it is possible to make the optical axes in alignment with each other, and match the light intensity distributions, and the optical path lengths in both forward and return paths between two different wavelength light beams with high precision, suppress aberration in the diffracted light beam, and share the light-receiving portion of the signal detection light-receiving element in the return path side.

Second Embodiment

Next, a semiconductor laser device according to a second embodiment will be described.

Figure 8A:
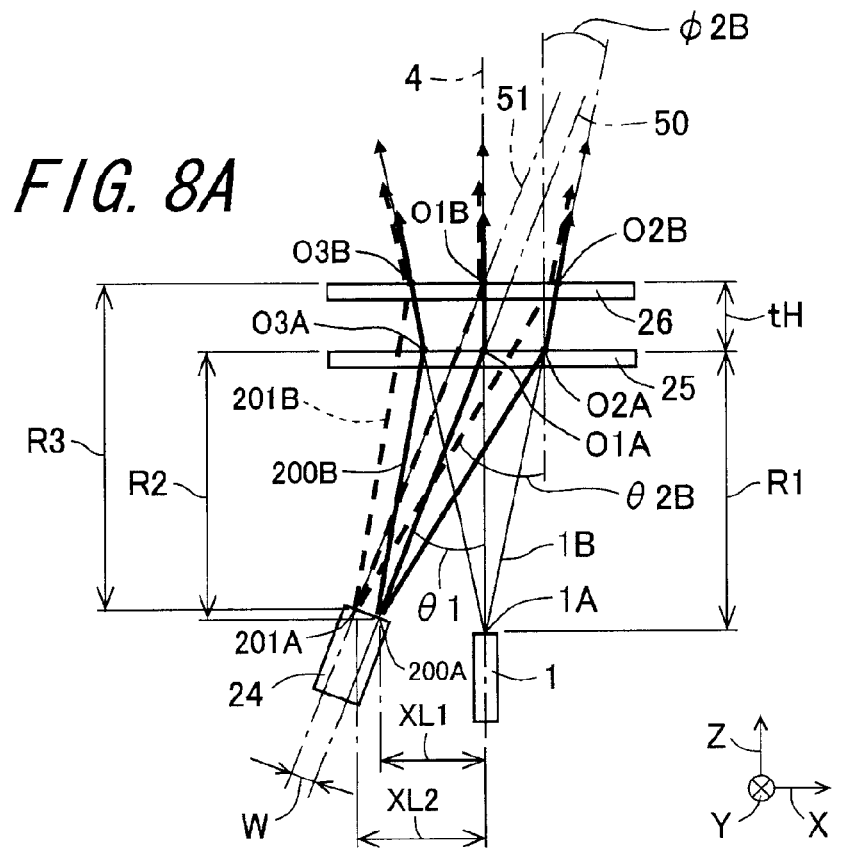
Figure 8B:
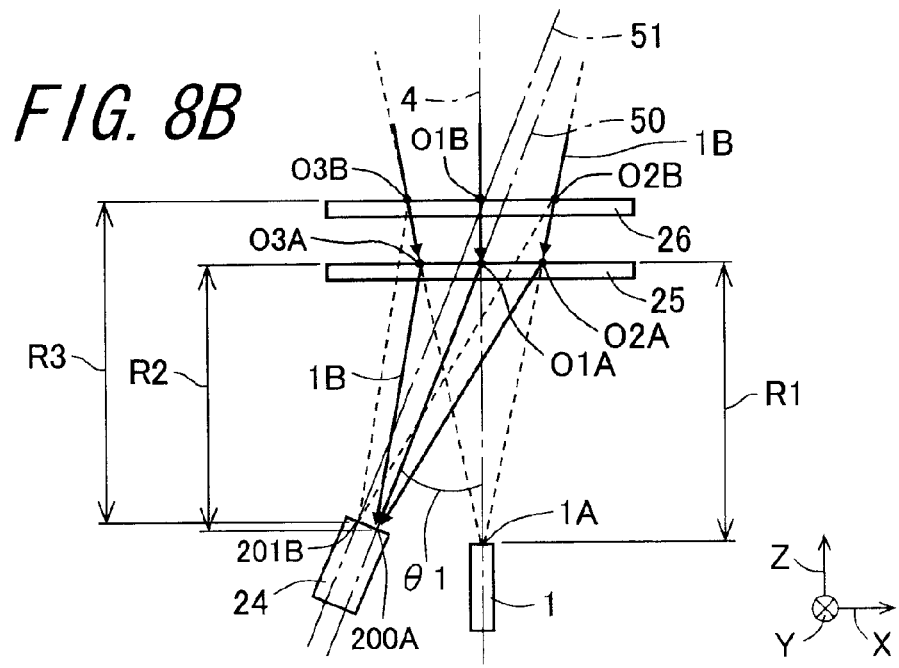
Figure 9:
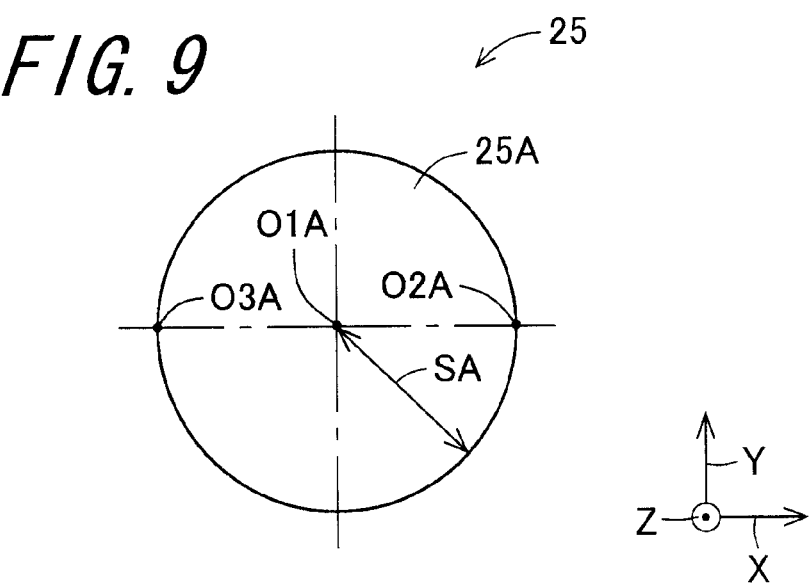
FIG. 9 is a front view illustrating a first diffractive element mounted in the semiconductor laser device of FIGS. 8A and 8B.
Figure 10:
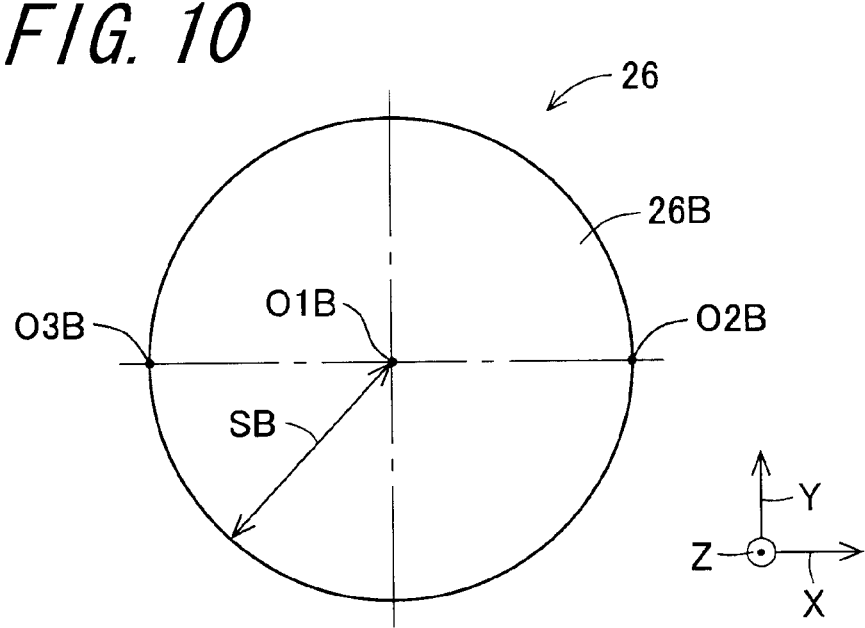
FIG. 10 is a front view illustrating a second diffractive element mounted in the semiconductor laser device of FIGS. 8A and 8B.
Figure 11A:
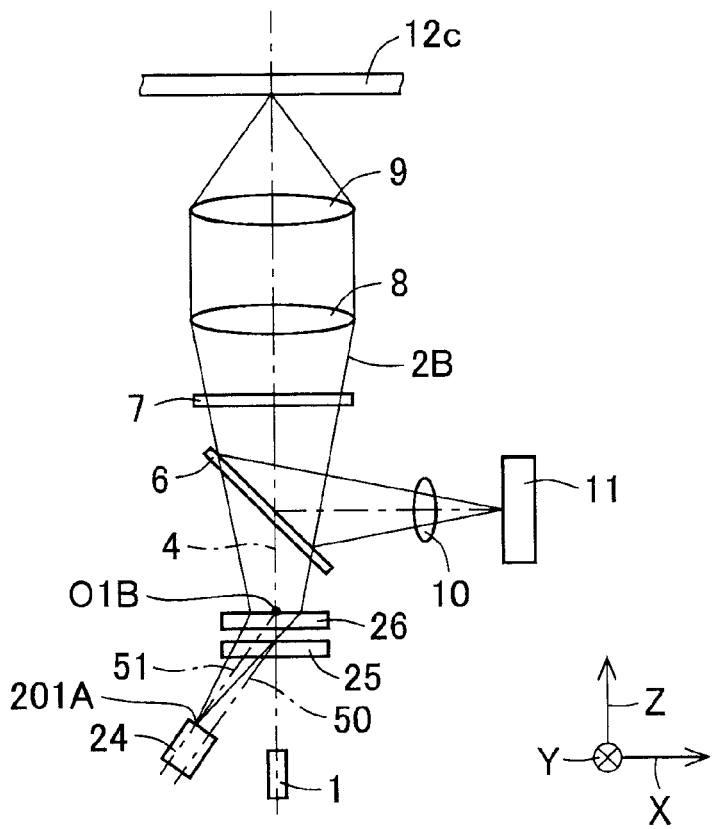
Figure 11B:
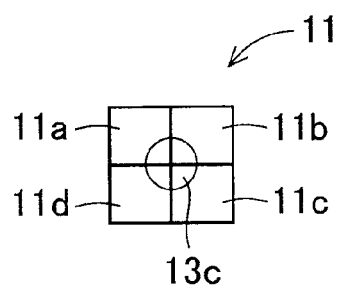

FIGS. 8A and 8B are simplified cross-sectional view illustrating a schematic configuration of a semiconductor laser device according to a second embodiment, in which FIG. 8A illustrates a forward optical path of the semiconductor laser device, and FIG. 8B illustrates a return optical path of the semiconductor laser device. FIG. 9 is a front view illustrating the first diffractive element 25 mounted in the semiconductor laser device of FIGS. 8A and 8B, and FIG. 10 is a front view illustrating the second diffractive element 26 mounted in the semiconductor laser device of FIGS. 8A and 8B. FIGS. 11A and 11B are diagrams illustrating an optical pickup apparatus having the semiconductor laser device of FIGS. 8A and 8B, in which FIG. 11A is a simplified cross-sectional view illustrating a schematic configuration of the optical pickup apparatus, and FIG. 11B is a plan view illustrating the signal detection light-receiving element 11 arranged in the optical pickup apparatus as seen from the top. Throughout the embodiments and related drawings, like components are denoted by like reference numerals, and description thereof will be omitted.

In the semiconductor laser device according to the second embodiment, the light source 2 including the semiconductor laser element that emits a light beam having the second wavelength $\lambda 2$ is substituted with a light source 24 including semiconductor laser elements emitting light beams having second and third wavelengths, and the diffractive element 3 is substituted with first and second diffractive elements 25 and 26, unlike the structure of the semiconductor laser device of the first embodiment. The first diffractive element 25 has the same arrangement as that of the diffractive element 3 of the first embodiment, in which the first diffractive element 25 is separated from the light originating point 1A of the light source 1 with a distance R1 and perpendicular to the optical axis 4 at the position where the center point O1A of the first diffractive element 25 passes through the optical axis 4 of the light source 1.

The second diffractive element 26 is separated from the first diffractive element 25 with a distance tH in the Z direction and perpendicular to the optical axis 4 of the light source 1 at the position passing through the center point O1B of the second diffractive element 26. The light source 24 includes a light originating point 200A of the second wavelength λ2 and a light originating point 201A of the third wavelength λ3, and has a monolithic structure by which two light sources can be manufactured in a single device according to photolithography. The light beams emitted from the light originating points of the respective wavelengths are paralleled. In addition, each light originating point is separated with a distance W and positioned in the X direction such that the light originating point 200A of the wavelength λ2 is separated from the light originating point 1A of the first wavelength λ1 with a distance XL1, and the light originating point 201A of the third wavelength λ3 is separated from the light originating point 1A of the first wavelength λ1 with a distance XL2 which is farther than the distance XL1 of the second wavelength λ2.

In addition, the light originating point 200A is separated from the center point O1A to with a distance R2 in the Z direction such that the optical axis 50 from the light originating point 200A of the second wavelength λ2 is inclined at an angle θ1 with respect to the first diffractive element 25 through the center point O1A of the first diffractive element 25. The light originating point 200B is separated from the center point O1B with a distance R3 in the Z direction such that the optical axis 51 from the light originating point 201A of the third wavelength λ3 is inclined at an angle θ1 with respect to the second diffractive element 26 through the center point O1B of the second diffractive element 26. The distances R1, R2, and R3 are not absolute distances, but optical distances (that is, optical path lengths).

The first diffractive element 25 has the same structure as that of the diffractive element 3 of the aforementioned embodiment and includes a diffractive area 3A within a circle of a radius SA from the center point O1A. The diffractive area 3A has a diffractive grating pattern formed to exhibit an imaginary light source by diffracting only the light beam having the second wavelength λ2 emitted from the light source 2 so that the first-order diffracted light beam thereof is made in alignment with the optical axis 4, and a light beam is emitted from the light originating point 1A of the first light source 1 separated from the point O1A on the optical axis 4 with a distance R1. The diffractive area 3A has wavelength selectivity for transmitting a light beam having a wavelength λ3. That is, the diffractive area 3A is an area for transmitting the light beam having the wavelength λ3 and diffracting the return path light beam having of the wavelength λ2 of the light source 2. The diffractive grating pattern is formed such that, for the return path light beam entering an arbitrary point of the diffractive area with the same angle as that of the forward path light beam, the condensing point of the zero-order diffracted light beam passing through the diffractive area 3A matches with the light originating point 1A of the first light source 1.

Next, the structure of the second diffractive element 26 will be described. The second diffractive element 26 includes a diffractive area 26B which is circular area stretching from the center point O1B with a radius SB. The diffractive area 26B diffracts only the light beam having the third wavelength λ3 emitted from the light originating point 201A of the light source 24, and has a diffractive grating pattern formed to exhibit an imaginary light source such that the first-order diffracted light beam thereof is made in alignment with the optical axis 4, and a light beam is emitted from the light originating point 1A of the first light source 1 separated from the point O1A on the optical axis 4 with a distance R1+tH. The diffractive area 26B has wavelength selectivity for transmitting the light beams having wavelengths λ1 and λ2.

Each diffractive area of the diffractive elements 25 and 26 is provided with diffractive grating by forming a birefringent material including polymer liquid crystals on an optical planar substrate as disclosed in Japanese Examined Patent Publication JP-B2 4474706 and the like, and filling an acryl-based isotropic material, so as to provide wavelength selectivity and polarization characteristics.

The grating pitch of the diffractive grating pattern of the diffractive area 25A is similar to that of the first embodiment, and detailed description thereof will be omitted. First, the diffractive grating pattern of the diffractive area 26B will be described. Similarly, the diffractive element 26 also has a diffractive grating pattern having an embossed shape (not shown), and the pitch thereof can be obtained as follows.

The pitch p2B of the diffractive grating pattern at the point O2B satisfies the following condition:

$$p2B = \lambda 3/(\sin \theta 2B - \sin \phi 2B) \tag{8}$$

where, O2B denotes a point separated from the center point O1B of the diffractive area 26B on the X-Y plane with a radius SB in the +X direction, O2B denotes an incident angle of the forward path light beam having the third wavelength λ3 emitted from the light originating point 201A of the light source 24 to the point O2B of the diffractive area 26B, and φ2B denotes a diffraction angle of the positive first-order diffracted light beam.

However, the incident angle θ2B and the diffraction angle φ2B are defined as follows.

$$\phi 2B = a \tan(SB/R1) \tag{9}$$

$$\theta 2B = a \tan((XL2+SB)/R3) \tag{10}$$

Here, XL2 denotes a light originating point distance between the light originating point 1A of the first light source 1 and the light originating point 201A of the third light source of the light source 24, and satisfies the following condition.

$$XL2 = XL1 + w \cdot \cos \theta 1 \tag{11}$$

In addition, the distance R3 from the light originating point 201A of the third light source of the light source 24 to the second diffractive element 26 in the Z direction satisfies the following condition.

$$R3 = tH + R2 - w \cdot \sin \theta 1 \tag{12}$$

Similarly, if, even for any point of the diffractive area 26C on the second diffractive element 26 and other non-illustrated positions, the incident angle θ and the diffraction angle φ are determined such that the position of the imaginary light source by the return path light beam of the light beam having the wavelength λ3 from the light originating point 201A of the light source 24 matches with light originating point 1A of the light source 1, it is possible to obtain the diffractive grating pitch in each position. Here, detailed description thereof will be omitted.

In addition, by changing the shape of the diffractive area of the diffractive element from the embossed shape to a saw-tooth shape, it is possible to increase the diffraction efficiency of the first-order diffracted light beam emitted from the diffractive elements 25 and 26.

By forming the diffractive elements 25 and 26 on independent optical planar substrates, it is possible to independently adjust each position to more optimal position in each wavelength. In addition, it is possible to simplify the manufacturing process by integrating the diffractive elements 25 and 26.

Next, a structure and a principle of operations of the optical pickup apparatus having the aforementioned semiconductor laser device will be described. Since components other than the semiconductor laser device are similar to those of the aforementioned embodiment, like components are denoted by like reference numeral, and description thereof will be omitted. In addition, the wavelength λ1 emitted from the light source 1 and the wavelength λ2 emitted from the light originating point 200A of the light source 24 are similar to those of the first embodiment, and description for the operation thereof will be omitted.

A case where the wavelength λ3 is emitted from the light originating point 201A of the light source 24 will be described. The light beam having the wavelength λ3 emitted from the light originating point 201A of the light source 24 is transmitted through the diffractive element 25, and the first-order diffracted light beam of the diffractive area 26C of the diffractive element 26 is diffracted, so that the angle of the optical axis is changed from the optical axis 51 to the optical axis 4. As described above, when the optical distance from the position of the light originating point 201A of the light source 24 to the center point O1B corresponding to the cross point between the optical axis 4 and the optical axis 51 of the diffractive element 26 is set to R3, an imaginary light originating point of the positive first-order diffracted light beam diffracted by the diffractive element 26 matches with the light originating point 1A of the light source 1, and the center of the intensity distribution of the light beam having the wavelength λ3 emitted from the optical axis 51 matches with the center point O1B of the diffractive element 26. Therefore, the light spot 13c of the return path of the wavelength λ3 condensed onto the signal detection light-receiving element 11 is narrowed at maximum when it is condensed onto the optical recording medium 12c, and the condensing position and the center position of the intensity distribution thereof are also matched with those of the condensing light spot 13a of the wavelength λ1 and the condensing light spot 13b of the wavelength λ2 so as to be incident onto the center position of the light-receiving portions 11a to 11d. As a result, even when the light beam having the wavelength λ3 is oscillated, a balance deviation or a focus deviation is hard to be generated in the servo signal.

That is, by matching the optical path lengths of the light beams of the wavelengths λ1, λ2 and λ3 in the forward path side, the optical path lengths in the return path side are matched, and the condensing light spot positions on the signal detection light-receiving element 11 are matched. In addition, by matching the centers of the light intensity distribution of the light beams of the wavelengths λ1, λ2 and λ3 on the center point O1A of the diffractive element 25 and the center point O1B of the diffractive element 26, it is possible to match the center positions of the intensity distribution of the light spot 13 on the signal detection light-receiving element 11, and reduce aberration of the further diffracted light beams of the wavelength λ2 and λ3. Therefore, the light-receiving portions can be shared. Meanwhile, a balance deviation or a focus deviation is hard to be generated in the servo signals of the light beams having three different wavelengths, and it is possible to more stably detect the recording signal on the optical recording medium.

The diffractive element adjustment apparatus that adjusts the positions of the diffractive elements 25 and 26 in the semiconductor laser device is substantially similar to that of the first embodiment in the sense of an apparatus structure and an adjustment method. The adjustment unit and the adjustment process can be added just by increasing the number of components for a single wavelength, and description will be omitted.

Third Embodiment

Next, a semiconductor laser device according to a third embodiment of the technology will be described. Like components are denoted by like reference numerals as in the semiconductor laser device of the first and second embodiments, and description thereof will be omitted.

Figure 12A:
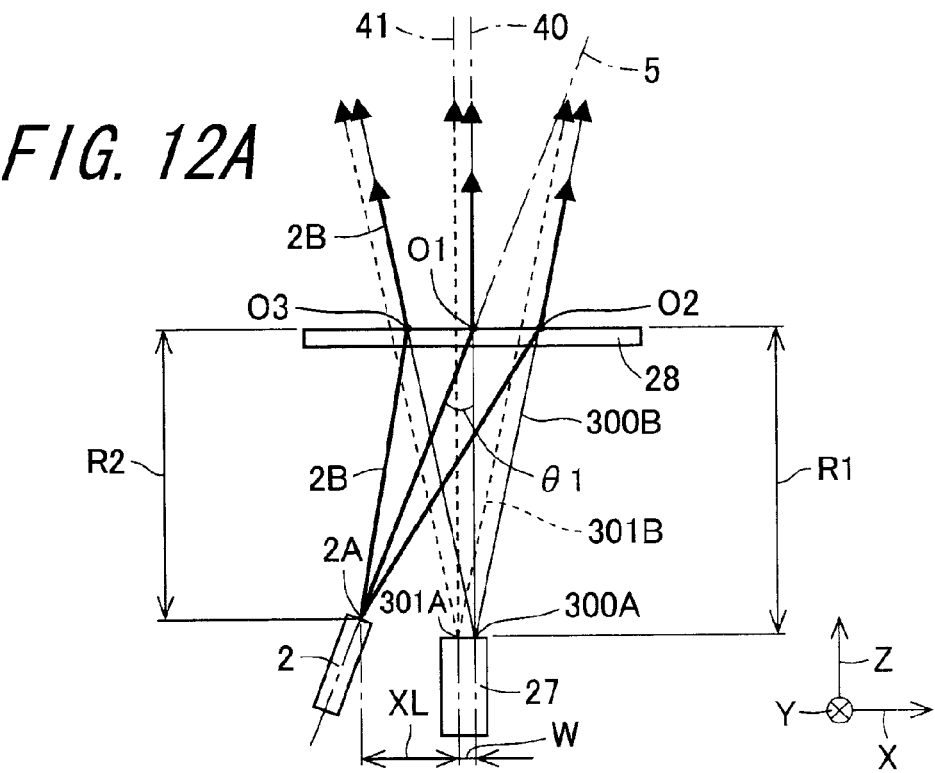
Figure 12B:
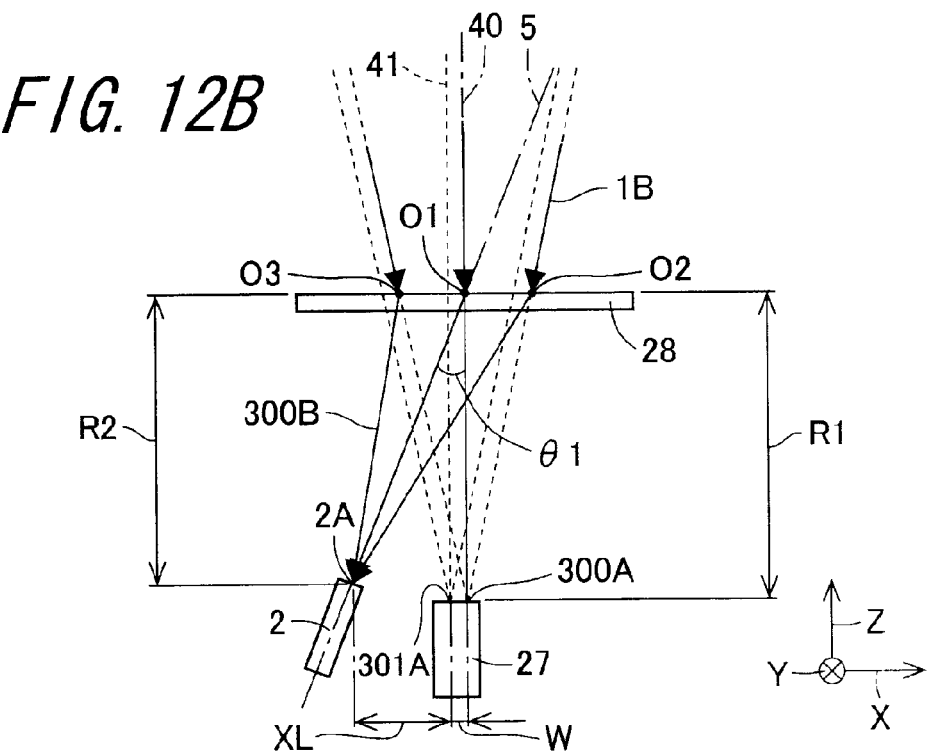
Figure 15:
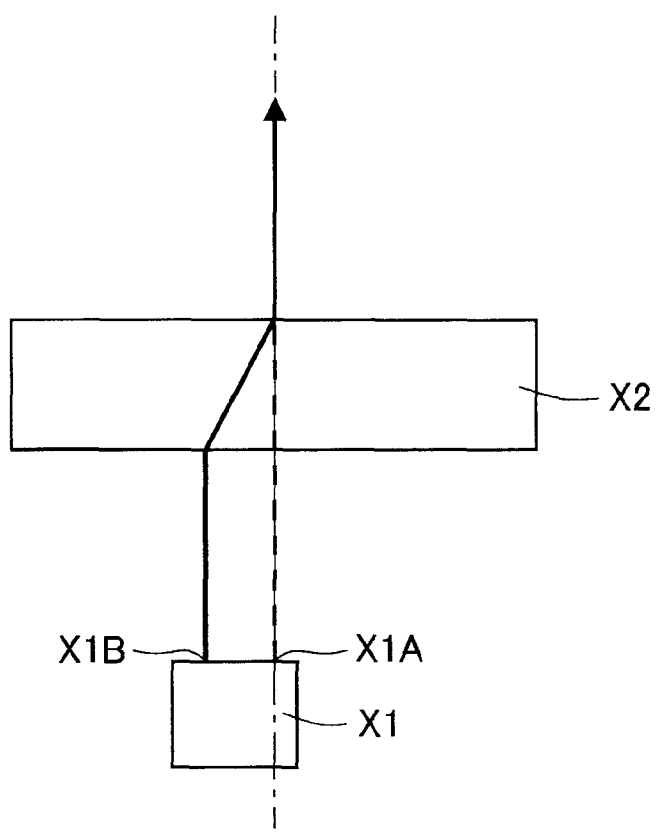
FIG. 15 is a simplified cross-sectional view illustrating a schematic configuration of a semiconductor laser device according to a first related art.
Figure 16A:
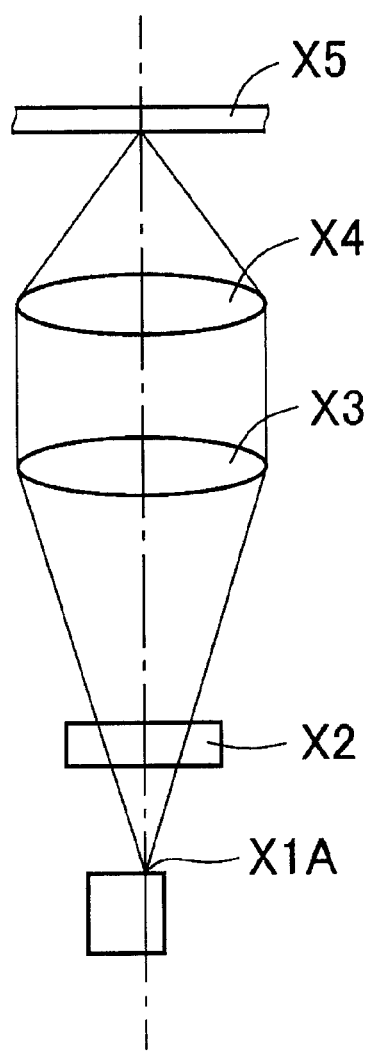
FIGS. 16A and 16B are simplified cross-sectional view illustrating a schematic configuration of an optical pickup apparatus having the semiconductor laser device of FIG. 15.
Figure 16B:
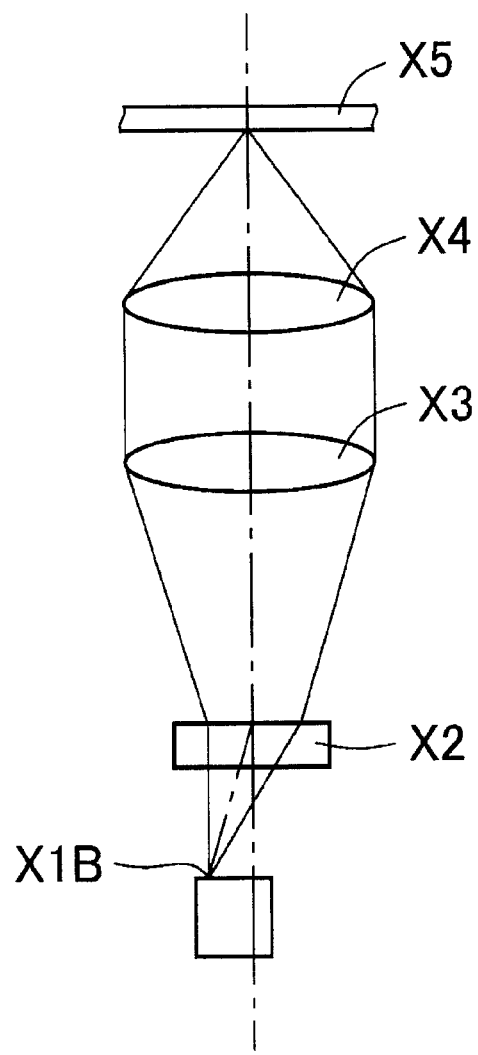
Figure 17:
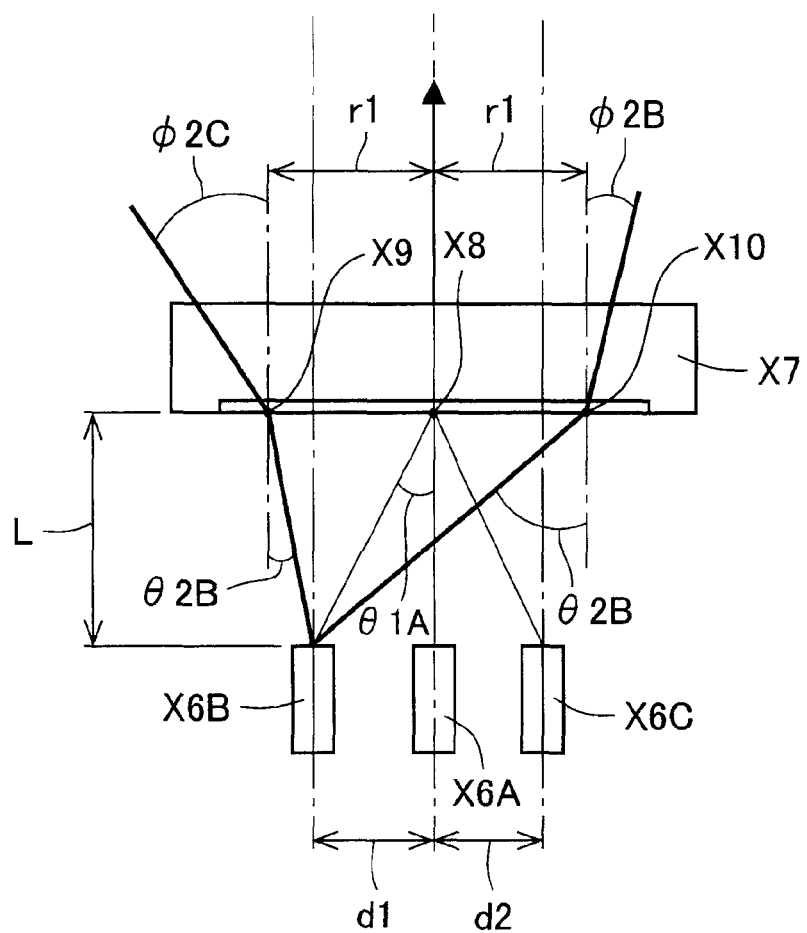
FIG. 17 is a simplified cross-sectional view illustrating a schematic configuration of a semiconductor laser device according to a second related art.
Figure 18:
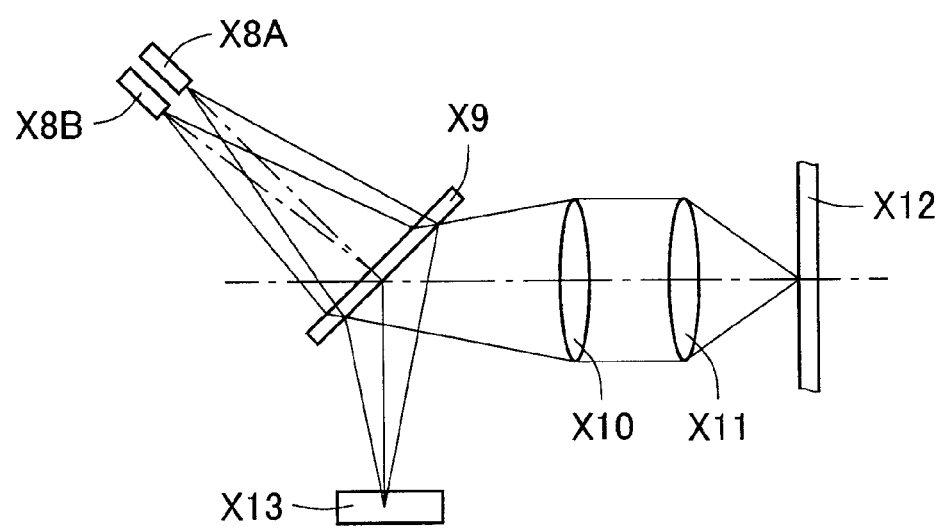
FIG. 18 is a simplified cross-sectional view illustrating a schematic configuration of an optical pickup apparatus according to a third related art.

FIGS. 12A and 12B are simplified cross-sectional views illustrating a schematic configuration of the semiconductor laser device according to a third embodiment, in which FIG. 12A illustrates a forward optical path of the semiconductor laser device, and FIG. 123 illustrates a return optical path of the semiconductor laser device. FIGS. 13A to 13C are diagrams illustrating an optical path when the light beam having the third wavelength λ3 is oscillated, and FIGS. 14A to 14C are diagrams illustrating a condensing position in the return path in which the light beam having the third wavelength λ3 is condensed onto the signal detection light-receiving element 29. Like components are denoted by like reference numerals as in the aforementioned embodiments.

Unlike the structure of the semiconductor laser device of the second embodiment, in the semiconductor laser device of the present embodiment, the position of the light source 1 including the semiconductor laser element that emits the light beam having the first wavelength λ1 and the position of the semiconductor laser element that is the second and third light sources 2 and 3 are switched with each other, and the diffractive element 28 is substituted with the diffractive elements 25 and 26. The diffractive element 28 has the same arrangement as that of the diffractive element 3 of the first embodiment and is separated from the light originating point 300A of the light source 27 of the second wavelength λ2 with a distance R1 such that the center point O1 of the diffractive element 28 is perpendicular to the optical axis 40 at the position passing through the optical axis 40 from the light originating point 300A.

The light source 27 includes a light originating point 300A of the second wavelength λ2 and a light originating point 301A of the third wavelength λ3, and has a monolithic structure by which two light sources can be integrated into a single device according to photolithography. The light beams emitted from the light originating points 300A and 301A of the respective wavelengths are parallel to each other, and the light originating points 300A and 301A are separated with a distance W.

Furthermore, the light source 2 has a light originating point 2A of the first wavelength λ1, and is arranged in the position of the distance XL in the X direction from the light originating point 300A of the second wavelength λ2 as in the light originating point 2A of the first embodiment. In addition, the optical axis 5 of the first wavelength λ1 from the light originating point 2A passes through the center point O1 of the diffractive element 28 and is inclined with an angle of θ1 with respect to the diffractive element 28, and the light originating point 2A is separated from the center point O1 with a distance R2 in the Z direction. The distances R1 and R2 are not absolute distances, but are optical distances (that is, the optical path lengths).

The diffractive element 28 may include a diffractive area similar to the diffractive element 3 of the first embodiment, and its shape has a circular area 3A with a radius SA from the center point O1. The diffractive area 3A has a diffractive grating pattern formed to diffract the light beam having the first wavelength λ1 emitted from the light source 2 and exhibit an imaginary light source such that the first-order diffracted light beam thereof is made in alignment with the optical axis 40 of the second wavelength λ2, and the light beam is emitted from the light originating point 300A of the first light source separated from the point O1 on the optical axis 40 with a distance R1. The diffractive area 3A has wavelength selectivity for transmitting the light beams having the second and third wavelengths λ2 and λ3 emitted from the light originating points 300A and 301A of the light source 27.

That is, the diffractive area 3A has a diffractive grating pattern formed to diffract the forward path light beam having the first wavelength λ1 of the light source 2 such that the imaginary light originating point of the first-order diffracted light beam having the wavelength λ1 of the light source 2 diffracted from the diffractive area 3A matches with the light originating point 300A of the light source 27.

In addition, similar to the first embodiment, the grating pitch of the diffractive grating pattern of the diffractive area 3A can be computed based on relative positions between each light source and the diffractive element, and detailed description thereof will be omitted.

Next, a structure and a principle of operation of the optical pickup apparatus having the aforementioned semiconductor laser device will be described. Components other than the semiconductor laser device are similar to those of the first embodiment except for the signal detection light-receiving element 11, like components are denoted by like reference numerals, and description thereof will be omitted. In the present embodiment, as shown in FIGS. 13A to 13C, the aforementioned signal detection light-receiving element 11 is substituted with the signal detection light-receiving element 29. As shown in FIGS. 14A to 14C, the signal detection light-receiving element 29 includes at least 8 light-receiving portions 400a to 400d; 401a to 401d.

First, a case where the light beam having the wavelength λ2 is emitted from the light originating point 300A of the light source 27 will be described.

Out of the light beams having the second wavelength λ2 emitted from the light source 27, the zero-order diffracted light beam diffracted by the diffractive area 3A of the diffractive element 28 is transmitted along the optical axis 40, and is then guided to the signal detection light-receiving element 29 through the forward optical path from the polarization beam splitter 6 to the optical recording medium 12b and the return optical path from the optical recording medium 12b to the signal detection light-receiving element 29. In addition, the intermediate optical system is similar to those of the first and second embodiments, and description thereof will be omitted. The signal detection light-receiving element 29 is arranged such that the light spot 13b condensed onto the signal detection light-receiving element 29 corresponds to the center of the light-receiving portions 400a to 400d.

The light beam of the third wavelength λ3 emitted from the light source 27 is diffracted by the diffractive area 3A of the diffractive element 28, and its zero-order diffracted light beam is transmitted along the optical axis 41, and is then guided to the signal detection light-receiving element 29 through the forward optical path from the polarization beam splitter 6 to the optical recording medium 12c and the return optical path from the optical recording medium 12c to the signal detection light-receiving element 29. However, since the light originating point 301A of the third wavelength λ3 is separated from the light originating point 300A of the second wavelength λ2 with a distance W, the condensing position of the light spot 13c condensed onto the signal detection light-receiving element 29 is deviated depending on the optical magnification in the return path side at the position where the light spot 13b is condensed, and the light beam is incident onto the center of the light-receiving portions 401a to 401d.

In addition, the optical axis of the light beam having the first wavelength λ1 emitted from the light source 2 is converted by the diffractive area 3A of the diffractive element 28 and the diffractive element 28, and the negative first-order diffracted light beam thereof is diffracted along the optical axis 40, and is then guided to the signal detection light-receiving element 29 through the forward optical path from the polarization beam splitter 6 to the optical recording medium 12a and the return optical path from the optical recording medium 12a to the signal detection light-receiving element 29. The signal detection light-receiving element 29 is arranged such that the light spot 13a condensed onto the signal detection light-receiving element 29 serves as the center of the light-receiving portion 400a to 400d as in the second wavelength λ2.

A method of detecting the servo signal in each wavelength is similar to that of the first embodiment, and description thereof will be omitted.

According to the third embodiment, only the third wavelength λ3 has a different light-receiving area. Therefore, a diffractive element that diffracts only the wavelength λ3 for correcting a deviation of the gap in the light originating point of the light source 27 may be added between the polarization beam splitter 6 of the return optical path and the signal detection light-receiving element 29. In this case, it is possible to share the signal detection light-receiving element, and the light-receiving portions 401a to 401d are unnecessary.

Through the foregoing description, by matching the optical path lengths of the light beams having at least the wavelengths λ1 and λ2 in the forward path side, it is possible to match the optical path lengths in the return path side, and match the condensing spot positions on the signal detection light-receiving element 29. Furthermore, by matching the center of the light intensity distribution of the light beams having wavelength λ1 and λ2 on the center point O1 of the diffractive element 3, it is possible to match the center position of the intensity distribution of the light spot 13 on the signal detection light-receiving element 11. For this reason, it is possible to share the light-receiving portion, and a balance deviation or a focus deviation is hard to be generated in the servo signal of the light beams of three different wavelengths. Therefore, it is possible to more stably detect the recording signal on the optical recording medium.

The diffractive element adjustment apparatus that adjusts the positions of the diffractive element 28 in the semiconductor laser device according to the third embodiment is substantially similar to that of the second embodiment in the sense of an apparatus structure and an adjustment method. The adjustment unit and the adjustment process can be added just by increasing the number of components for a single wavelength, and description will be omitted.

In addition, similar to the first to third embodiments, the diffractive element for diffracting the forward path light beam is arranged perpendicularly to the optical axis emitted from the light source of the non-diffractive wavelength. However, without limiting the arrangement to such a direction, for example, the diffractive element may be arranged such that the light beam enters the diffractive element perpendicular to the optical axis emitted from the light source of the wavelength that diffracts the first-order diffracted light beam or with an angle approximate to the perpendicular direction, and it is possible to arrange the components such that pitch of the diffracting grating is formed.

As a method of detecting the focus error signal of the optical pickup apparatus having the semiconductor laser device according to the technology, a structure using an astigmatism method has been described. However, the technology may be similarly applied to, but not limited thereto, for example, a knife edge method or a beam size method.

As described above, by causing a light beam having one wavelength of light beams having at least two wavelengths in the light sources of a plurality of wavelengths to enter the output surface of the light source that emits the light beam having the other wavelength and then detecting an electric current value generated inside the light source and adjusting the diffractive element, it is possible to make the optical axes of light beams having a plurality of wavelengths in alignment with each other, and match the intensity distribution centers and optical path lengths thereof with high precision and stably detect the recording signal on the optical recording medium.

The technology may be embodied in other specific forms without departing from the spirit or essential characteristics thereof. The present embodiments are therefore to be considered in all respects as illustrative and not restrictive, the scope of the technology being indicated by the appended claims rather than by the foregoing description and all changes which come within the meaning and the range of equivalency of the claims are therefore intended to be embraced therein.

What is claimed is:

1. A semiconductor laser device comprising:
   a plurality of light sources that emit light beams having different wavelengths; and
   a diffractive element that diffracts a light beam so that an optical axis of a light beam having a wavelength emitted from one of two light sources among the plurality of the light sources is made in alignment with an optical axis of a light beam having a different wavelength emitted from the other of the two light sources, the diffractive element having a diffractive area where the light beam emitted from the one of the two light sources is diffracted with an angle which is formed by the optical axis of the light beam emitted from the one light source and the optical axis of the light emitted from the other light source so that a light beam which is emitted from the one light source and diffracted by the angle is aligned with a light beam which is emitted from the other light source and transmitted through the diffractive element,
   wherein an optical path length between the diffractive element and a light originating point of the one of the two light sources is equal to an optical path length between the diffractive element and a light originating point of the other of the two light sources, and
   the diffractive element diffracts the light beam emitted from the one of the two light sources so that an imaginary light originating point of the one of the two light sources coincides with the light originating point of the other of the two light sources.

2. The semiconductor laser device of claim 1, wherein the diffractive element has a diffractive area where a light beam having a wavelength emitted from the one light source is subject to first-order diffraction, and a light beam having a different wavelength emitted from the other light source is transmitted or subject to zero-order diffraction.

3. The semiconductor laser device of claim 1, wherein the diffractive element includes a diffractive area where the light beams having a plurality of wavelengths emitted from at least two or more light sources are subject to first-order diffraction to make optical axes in alignment with each other, and a light beam having a further different wavelength emitted from another light source is transmitted or subject to zero-order diffraction.

4. The semiconductor laser device of claim 1, wherein an output angle of the one light source for light beam having one wavelength to be diffracted matches with a straight line direction connecting a cross point between an optical axis of the other light source for the light beam having the other wavelength to be transmitted through the diffractive element and the diffractive area of the diffractive element, and the one light source for light beam having one wavelength to be diffracted.

5. The semiconductor laser device of claim 1, wherein the diffractive element includes a plurality of diffractive areas that diffract light beams having wavelengths other than the other wavelength in the light beam to be transmitted through the diffractive element, in an optical axis direction of the light beam having the other wavelength to be transmitted through the diffractive element, and that the optical axes of a plurality of light beams having the different wavelengths to be diffracted are made in alignment with the optical axis of the light beam having the other wavelength to be transmitted through the diffractive element.

6. The semiconductor laser device of claim 1, wherein the optical axis of the light beam having one wavelength to be diffracted is made in alignment with one of optical axes of a plurality of light beams having other wavelengths to be transmitted through the diffractive element.

7. The semiconductor laser device of claim 1, wherein the diffractive area includes a wavelength selectable diffractive area.

8. The semiconductor laser device of claim 1, wherein the diffractive area includes a polarization anisotropic diffractive area.

9. The semiconductor laser device of claim 1, wherein the diffraction area has a saw-tooth shape or an embossed shape obtained by approximating the saw-tooth shape.

10. An optical pickup apparatus comprising:
    the semiconductor laser device of claim 1;
    an optical system for irradiating an optical recording medium with a light beam emitted from the semiconductor laser device; and
    a signal detection light-receiving element for receiving a light beam reflected from the optical recording medium and reading a servo signal and an information signal.

11. The optical pickup apparatus of claim 10, wherein light beams having at least two or more wavelengths out of light beams having a plurality of wavelengths are received by a shared light-receiving portion.

12. A method of adjusting a position of a diffractive element of a semiconductor laser device, comprising:
    providing a semiconductor laser device of claim 1;
    receiving a light beam emitted from the one light source and diffracted by the diffractive area;
    detecting an electric current generated by the received light beam received; and
    adjusting the position of the diffractive element based on a value of the detected electric current.

* * * * *